United States Patent [19]
Wright et al.

[11] 3,905,873
[45] Sept. 16, 1975

[54] CONTROL APPARATUS FOR FRACTIONATION TOWER

[75] Inventors: Robert M. Wright; Allan W. Joncock, both of Texas City, Tex.

[73] Assignee: The Standard Oil Company, Chicago, Ill.

[22] Filed: Sept. 24, 1973

[21] Appl. No.: 400,000

[52] U.S. Cl. ............. 202/160; 196/132; 202/206; 203/1; 203/2; 203/3; 203/DIG. 8
[51] Int. Cl.² ..................................... B01D 3/42
[58] Field of Search ............. 203/1, 2, DIG. 18, 3; 202/160, 206; 196/141, 132, 100

[56] References Cited
UNITED STATES PATENTS

| | | | |
|---|---|---|---|
| 3,322,650 | 5/1967 | Hilburn | 203/1 |
| 3,342,702 | 9/1967 | Rijnsdorp | 203/1 |
| 3,361,646 | 1/1968 | MacMullan et al. | 203/1 |
| 3,392,088 | 7/1968 | Johnson | 203/1 |
| 3,411,308 | 11/1968 | Bellinger | 203/1 |
| 3,415,720 | 12/1968 | Rijnsdorp et al. | 196/141 |
| 3,420,748 | 1/1969 | Johnson et al. | 203/1 |
| 3,428,527 | 2/1969 | Rijnsdorp et al. | 203/1 |
| 3,428,528 | 2/1969 | Oglesby, Jr. et al. | 203/1 |
| 3,449,215 | 6/1969 | Johnson et al. | 196/132 |
| 3,619,377 | 11/1971 | Palmer et al. | 203/1 |
| 3,793,157 | 2/1974 | Hobbs et al. | 203/2 |
| 3,840,437 | 10/1972 | Awan et al. | 203/2 |
| 3,840,437 | 10/1974 | Awan et al. | 202/160 |

*Primary Examiner*—Norman Yudkoff
*Assistant Examiner*—D. Sanders
*Attorney, Agent, or Firm*—Philip Hill; Arthur G. Gilkes; William T. McClain

[57] ABSTRACT

Our novel control apparatus optimizes the operation of a fractionation tower. A feed varying in composition flows into the tower at an uncontrolled, varying rate. This feed is distilled so that a portion of the feed is withdrawn from the tower as distillate and another portion is withdrawn from the tower as bottoms. A part of the distillate is returned to the top of the tower as reflux. The control apparatus includes a reflux controller for automatically controlling the rate at which reflux is returned to the tower, a pressure controller for automatically controlling the pressure within the tower, a distillate controller for automatically controlling the rate at which distillate is withdrawn from the tower, and a bottoms controller for automatically controlling the rate at which bottoms are withdrawn from the tower. As the feed flow rate and feed composition change, distillate and bottoms flow rates are changed in proportion to these changes in feed. A divider circuit, responding to the feed flow rate and feed composition changes, controls the distillate and bottoms flow controllers so that the distillate and bottoms flow rates and the ratio between these flow rates are such that product specifications are maintained despite variations in the feed flow rate and feed composition. an override circuit, responding to fluctuations in the liquid level in the tower, controls the material balance within the tower. When the liquid level is in danger of exceeding predetermined level limits, the override circuit terminates control of the bottoms controller by the divider circuit and controls the bottoms controller as a function of the liquid level until the liquid level is no longer in danger of exceeding the predetermined level limits. The control apparatus includes means calibrated to maintain the bottoms flow rate such that the liquid level is within the level limits, and calibration means which calibrate said calibrated means whenever the override circuit terminates the divider circuit's control of the bottoms controller. The pressure controller maintains the tower pressure essentially constant, and it includes means for controlling the rate at which heat flows into the tower so that said heat flow rate is changed in response to any incipient pressure changes to maintain tower pressure essentially constant. The reflux controller includes means responsive to the reflux temperature for modifying the reflux flow rate as the reflux temperature deviates from a standard temperature. This reflux controller also includes means for establishing a maximum and minimum reflux flow rate. Preferably, the control apparatus also includes means for manually adjusting the ratio between the distillate and bottoms flow rates and for manually controlling the distillate and bottoms reflux and heat flow rates.

36 Claims, 12 Drawing Figures

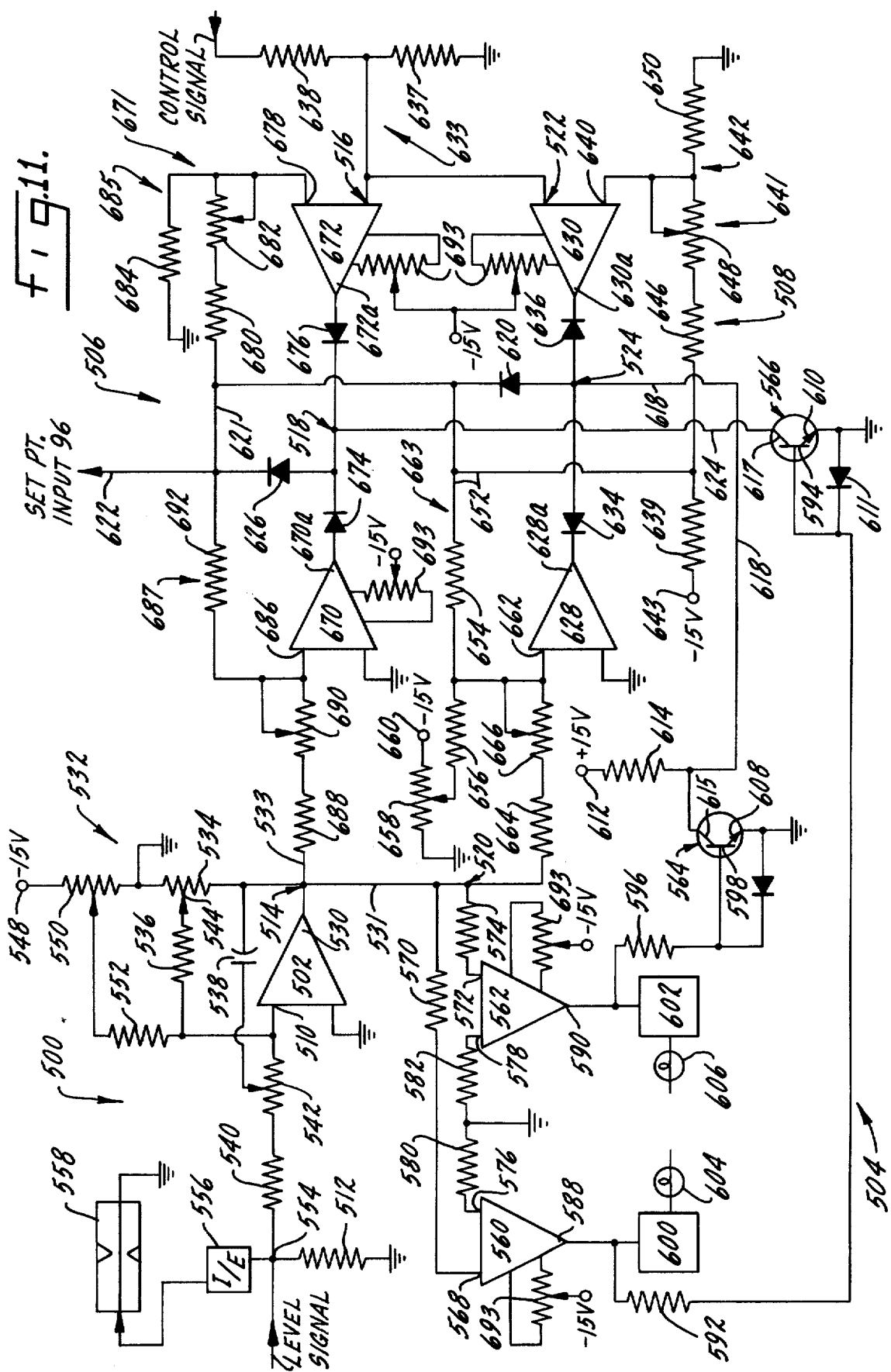

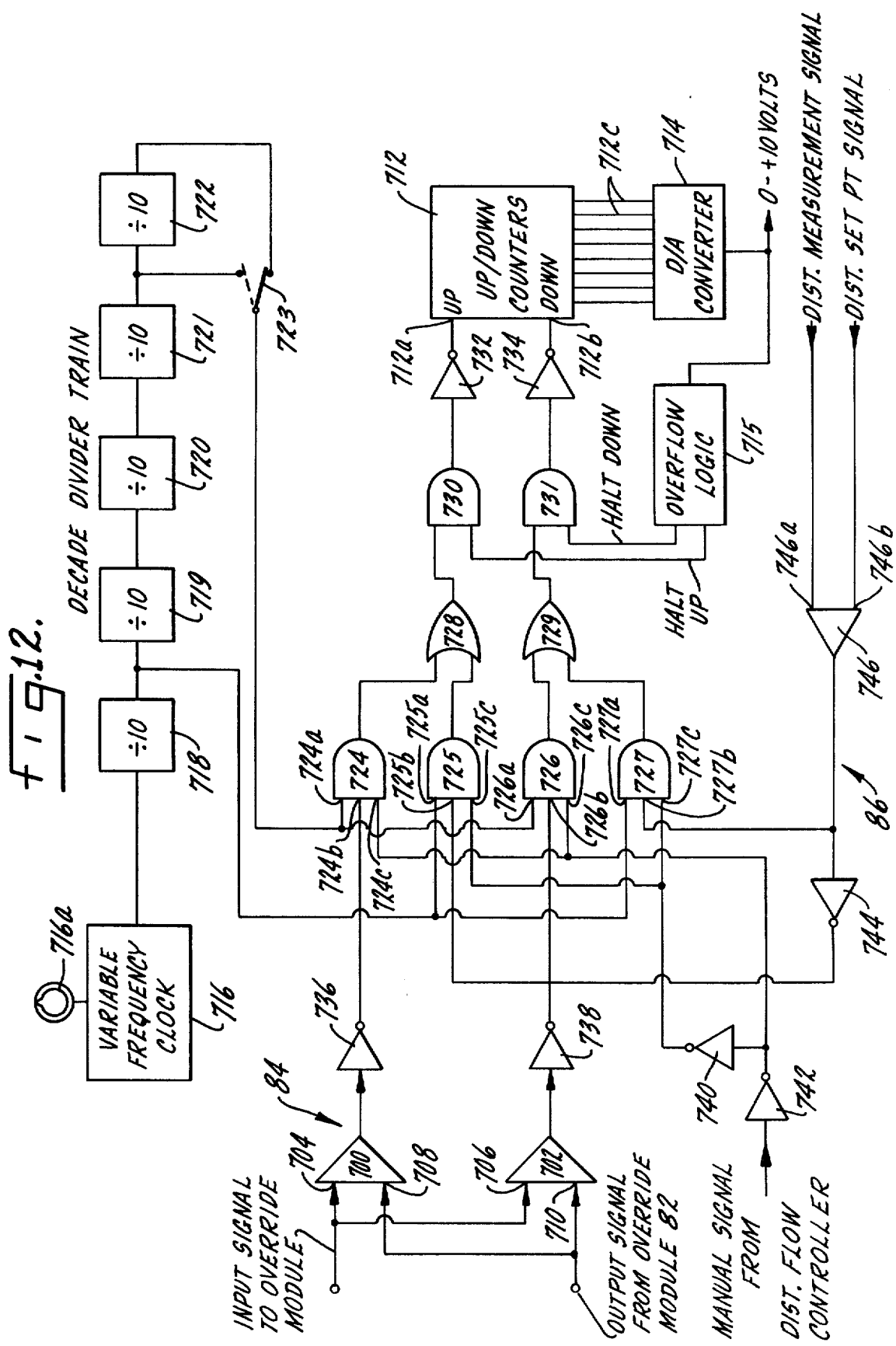

CONTROL APPARATUS FOR FRACTIONATION TOWER

BACKGROUND

A fractionation tower is an efficient unit widely used in the petroleum and chemical industries for separating the constituent components of a mixture of two or more materials having different boiling points. Frequently, it is used to separate hydrocarbons having different compositions. In this tower, vapors rise and liquid descends. As the hot rising vapors contact the cooler descending liquid, a heat interchange takes place. The vapors are cooled and some of the higher boiling constituents condense. The heat of condensation given up to the descending liquid vaporizes some of its lower boiling constituents. Hence, there is a gradual enrichment of the lower boiling constituent in the vapors as they rise in the tower, and an enrichment of the higher boiling constituent in the liquid as it descends.

The operation of the tower depends on intimate contact of the distilling vapors and the descending liquid. To achieve this intimate contact, the tower usually includes a series of horizontal trays stacked one on top of another. These trays have perforated bottoms which permit the liquid to flow downwardly as the vapors rise through liquid collected in the trays. In most commercial units, the mixture of materials flows into the tower at about the tower midpoint. Heat is usually supplied by withdrawing some of the material from the tower bottom, recycling it through a heat exchanger to the tower bottom, with steam being introduced into the heat exchanger to elevate the temperature of the withdrawn and recycled material. Eventually, the lower boiling material leaves the top of the tower and flows into a heat exchanger or condenser, and is condensed and collected in a receiving drum. A portion of this condensed material is withdrawn from the drum as distillate and another portion is recycled as reflux to the top of the tower. Because cooler reflux is added to the top of the tower, more heat must be introduced into the bottom of the tower to revaporize or "reboil" the reflux. Thus, any heavy material which may reach the top of the tower as vapor is condensed and rinsed back down the tower by the reflux. Any light material which may work its way into the bottom of the tower is revaporized or reboiled by the extra heat.

Efficient separation of the heavy and light constituents requires that the pressure within the tower remain constant. This is so because the boiling points of the constituents vary as to pressure changes. Thus, if the tower pressure fluctuates, the composition of the distillate and bottom products will fluctuate and be contaminated by more or less heavy or light constituents. At a constant pressure, the temperature of the vapor leaving the top of the tower is an indication of the vapor composition, and the efficiency of the separation of the light, lower boiling constituents from the heavier, higher boiling constituents. If this temperature deviates from a standard control temperature, the tower is failing to produce either distillate or bottom products which meet product specifications. Constant vapor temperature is an indication of product quality or composition only when the pressure in the tower is constant.

Tower pressure is a function of such conditions as feed composition, feed flow rate, reflux flow rate, reflux temperature, distillate flow rate, and heat flow rate. These conditions interact, sometimes producing undesirable results. For example, if all other conditions are constant and the heat flow rate increases, tower pressure will increase. If all other conditions are constant and the reflux flow rate incrases, tower pressure decreases. An increase in feed flow rate will decrease tower pressure and vice versa. These changes in feed flow rate can be compensated for to hold tower pressure constant by increasing heat flow rate or reducing the reflux flow rate or a combination of both. Each may be appropriate under different circumstances. For certain circumstances, a given reflux and heat flow rate may be correct to produce a good "split" between light and heavy constituents in the feed to the tower. Inadequate reflux and heat produces poor product separation. That is, either the distillate or bottoms product, or both, will fail to meet product specifications where the distillate may contain bottoms product or vice versa. Excess reflux "loads" the tower, preventing maximum throughput of feed. Consequently, less distillate and bottoms products are made in a given time. Such loading also uses excessive heat, and therefore, increases the product cost.

Under normal operating conditions, the feed to the tower may vary within broad limits in both flow rate and composition in an uncontrolled manner. To maintain tower pressure constant, offsetting these uncontrolled variables in the feed, the reflux flow rate, the distillate flow rate, the heat flow rate and the bottoms flow rate are increased or decreased in a controlled manner. In general, there are two types of control systems: feedback control systems and feed forward control systems. Both of these systems include monitors and controllers.

In a feedback system, the monitor monitors the controlled condition and when this condition deviates from the desired values, an error signal causes the controller to compensate for the deviation. Note that an error must occur in order to initiate the control function. The controller, in response to this error signal, changes the controlled condition until this condition is returned to the desired value. An analogy is frying meat in a heavy skillet where the temperature becomes too hot. One turns the heat down too far, but the weight of the skillet retaining heat still fries the meat. Accordingly, one turns the heat down again only to find shortly that there is not enough heat. Reversing the process ends up by applying too much heat. In other words, one observes the error and then attempts to correct for this error and ends up overcorrecting because of the time lag. This is the inherent disadvantage of feedback control systems.

In a feed forward system, the monitor monitors the uncontrolled condition which interacts with the controlled condition. When the uncontrolled condition varies, the monitor transmits to the controller an anticipating signal. The controller responds to this signal to change the controlled condition at the precise time and in the correct way to offset the effect of the uncontrolled condition. An analogy is driving on the highway and observing a car several cars in front which stops abruptly. One immediately brakes, anticipating the chain reaction to stop before the car immediately ahead stops. Thus one avoids ramming the car immediately ahead.

It would therefore seem that the ideal way to control a fractionation tower would be utilizing a feed forward control system, and both analog type and digital type feed forward control systems have been used. In a fractionation tower, the feed forward control system may monitor any increase or decrease in feed flow rate or other variables. An increase in feed flow rate would be accompanied by an increase in bottoms, heat, reflux, distillate and bottoms flow. If feed flow rate to the tower decreased, distillate, reflux, heat and bottoms flow rate would be decreased. These feed forward systems employ monitoring and measuring instruments which, however, have inherent inaccuracies and cannot be accurately calibrated. Thus there does occur some error in the monitoring or measuring and the operator in charge of the tower must take action to compensate for such inaccuracies. For example, full utilization of presently known analog devices results in a very complicated combination of dials and display devices on the control panel, making the actual operation of the tower very complex from an operator's viewpoint. The operator is required to exercise a high level of concentration and must be extensively trained. This can be obviated using digital type feed forward control systems. However, a complete feed forward control system operated by a digital computer requires excessive computer memory and program space as well as expensive peripheral equipment, plus highly trained experts to operate this equipment. These additional cost elements severely limit the use of digital type feed forward control systems.

THE INVENTION

We have now invented a control unit for a fractionation tower embodying a combination of feed forward and feedback concepts. It is essentially an analog computer control which is simple to operate, inexpensive to manufacture and maintain, and which provides precise control of the tower operations.

Briefly, our control unit includes four novel control systems: (1) a divider system (2) a reflux controller system, (3) a pressure controller system, and (4) an override system.

The divider system's prime function is to control the split between distillate and bottoms. As feed flow rate increases and decreases, this divider system insures that the distillate and bottoms flow rates accurately increase or decrease proportionately. If feed composition changes, this divider system can change the split between distillate and bottoms to insure that product specifications are maintained.

The reflux controller system regulates the reflux flow rate. As feed flow rate increases or decreases, the reflux flow rate is altered proportionately. A novel feature of this system is the use of the reflux temperature to alter the reflux flow rate if the reflux temperature deviates from a predetermined standard temperature. The system also includes means which (a) prevent the tower from becoming totally dry if feed flow is terminated, and (b) minimizes the likelihood of tower flooding, i.e. filling up with liquid.

The pressure controller system insures that the tower pressure remains essentially constant, and it includes a heat flow controller which regulates the heat flow rate. Heat flow is increased or decreased to maintain tower pressure constant in response to any incipient pressure changes. This system includes a manual station which permits an operator to switch between automatic and manual control. During manual control, a self alignment circuit provides procedureless switching back to automatic control. If tower pressure is incorrect on switching back to automatic control, the heat flow will be gradually, rather than abruptly, restored to the proper rate to correct tower pressure.

The override system insures that the material balance of the tower is maintained. This is achieved by continually monitoring the liquid level in the tower bottom. In accordance with our invention, the liquid level is permitted to fluctuate within predetermined limits without any corrective action taking place provided the level limits are not in danger of being exceeded as determined by the relationship between a control signal which is a function of feed flow rate, feed composition, or both, and a liquid level signal. If the relationship is incorrect, the override system is activated. In this condition the bottoms flow rate is controlled by the override system rather than the divider system. Nominally, the divider system is calibrated such that distillate and bottoms flow rates will maintain the liquid level within the limits. Going to the override state indicates that the calibration is inaccurate. In accordance with an important feature of our invention, during this override state, the divider system is recalibrated.

We have also invented a method for controlling the operation of a fractionation tower. Broadly, our method comprises (a) monitoring changes in feed composition and feed flow rate, (b) withdrawing distillate and bottoms from the tower at rates in accordance with changes in feed composition and feed flow rate, (c) maintaining the tower pressure essentially constant by controlling heat flow to the tower in accordance with changes in the feed composition and feed flow rate, and (d) permitting the liquid level in the bottom of the tower to fluctuate within predetermined upper and lower limits.

These and other features of our novel control system are shown in the accompanying drawings and explained in detail in the following description.

THE DRAWINGS

FIG. 11 is a circuit diagram of the override module shown in FIGS. 1 and 8.

FIG. 12 is a logic diagram of the calibrator control and calibrator modules shown in FIGS. 1 and 8.

GENERAL DESCRIPTION OF CONTROL UNIT

Figure 1:
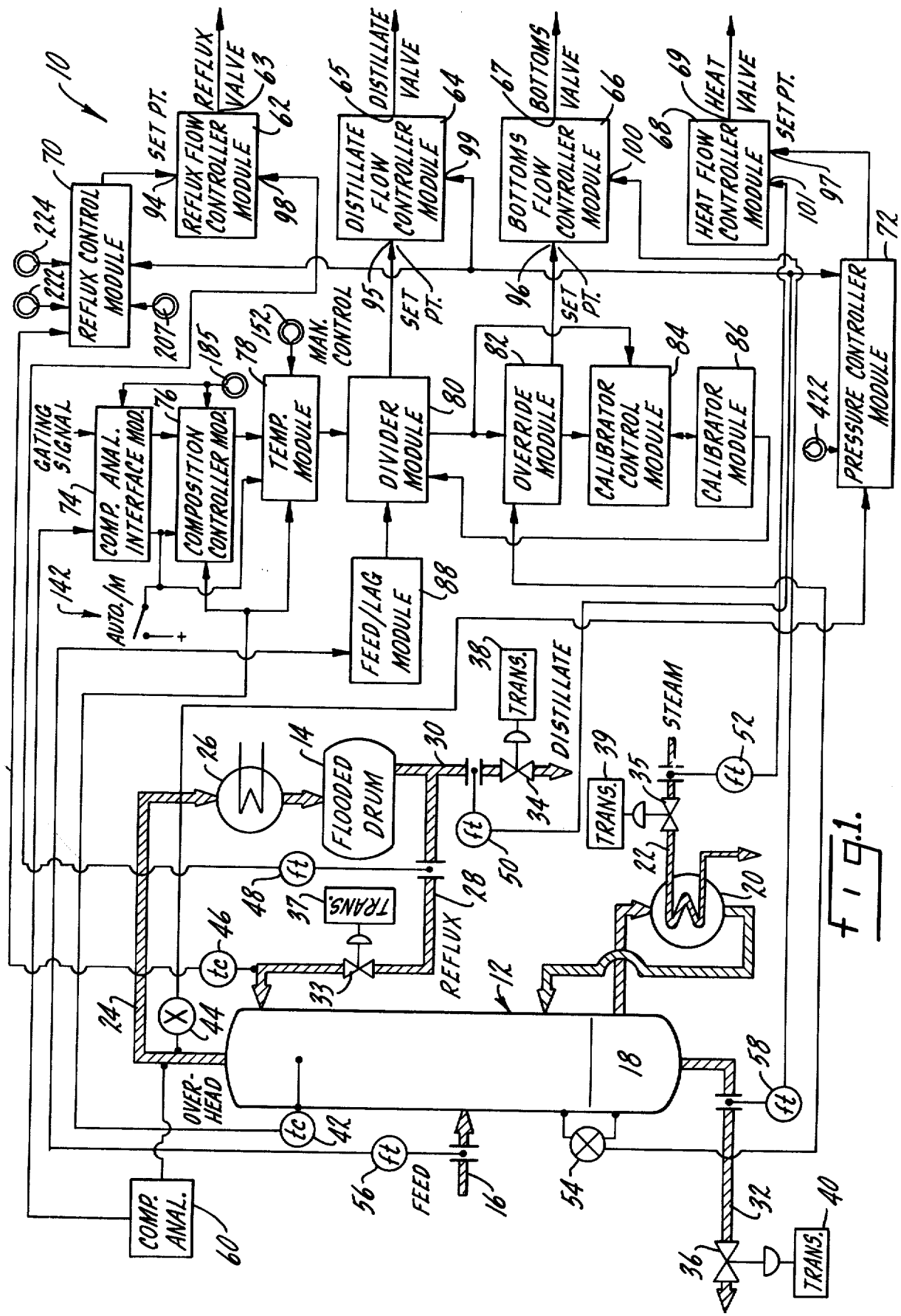
FIG. 1 is a schematic drawing of a fractionation tower equipped with a contraol unit of our invention.
Figure 2:
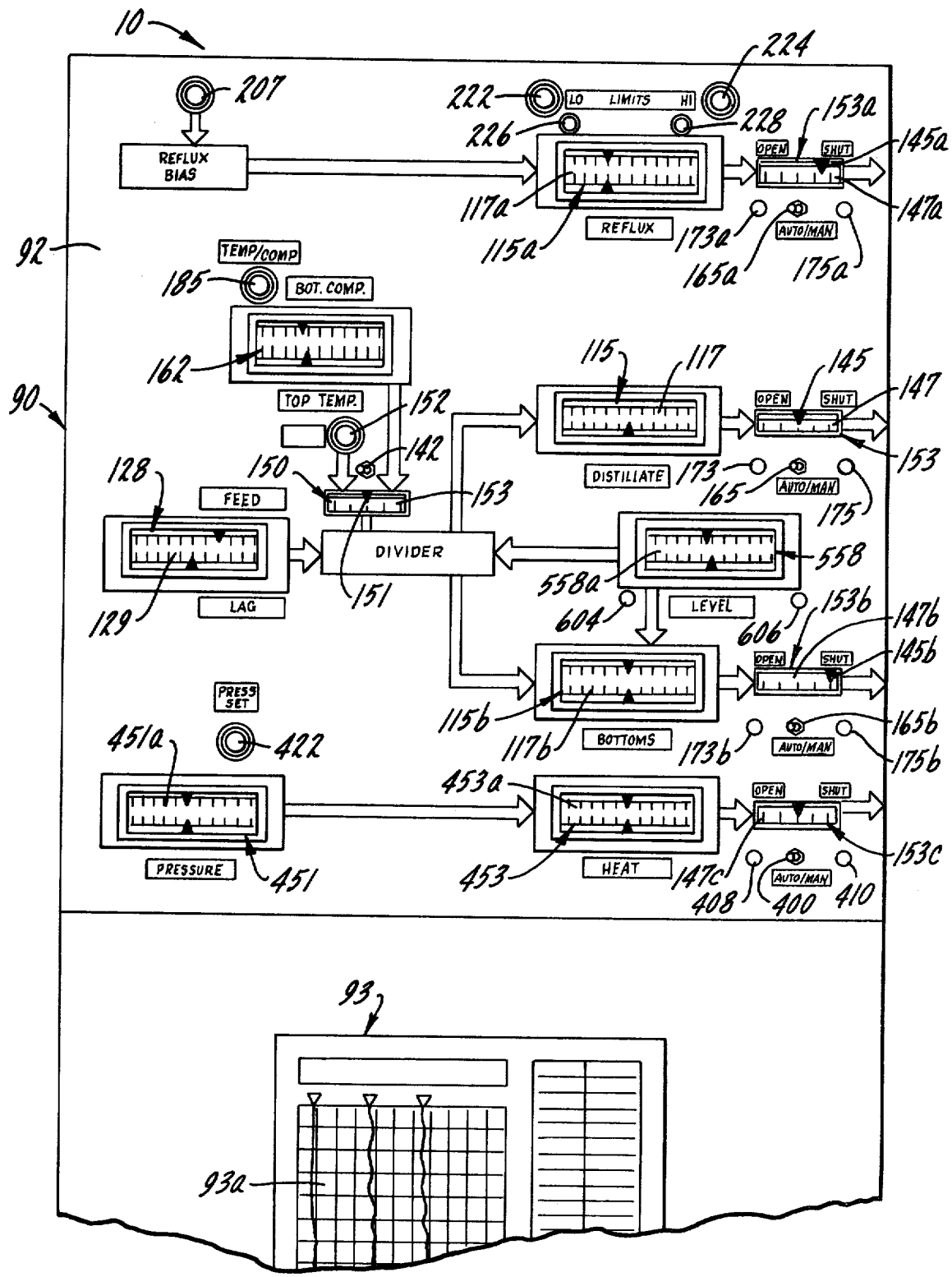
FIG. 2 is a front view of our control unit showing the control panel where the various indicator lights, meters, scales, and manually operated switches and dials are displayed.

As shown in FIGS. 1 and 2, our control unit 10 is used to control the operation of a fractionation tower 12 employing a flooded condenser drum 14. The tower 12 is shown with feed being introduced through a feed line 16 to about the midpoint of the tower 12. Liquid 18 at the bottom of the tower 12 circulates through a heat exchanger 20, and steam or other heating medium introduced into the heat exchanger through a valved heat line 22, heats this liquid. The feed is thus distilled with the light ends being removed as vapor or overhead from the top of the tower 12 via a vapor line 24. These vapors flow through a condenser 26 and condense to flood the condenser drum 14. Distillate flows from the bottom of this drum 14 and is split into two streams. One stream is recycled as reflux to the top of the tower through a valved reflux line 28. The other stream is withdrawn through a valved distillate line 30. The liquid 18 comprises the heavy ends or bottoms of the feed which are withdrawn from the tower 12 via valved bottoms line 32. Valves 33, 34, 35 and 36, respectively in lines 28, 30, 22 and 32 are provided with respective transducers 37, 38, 39 and 40 which open and close the valves in accordance with an electrical control signal received by the transducers.

Our control unit 10, in response to signals from monitoring stations in the tower 12, forwards control signals to the valve transducers 37 through 40 to regulate flow rates of the reflux, distillate, heat and bottoms, respectively. The monitoring stations include: a thermocouple 42 in the upper part of the tower 12 which provides a voltage signal directly proportional to temperature; a pressure transmitter 44 in the overhead line 24 which monitors tower pressure and provides a voltage signal directly proportional to this pressure; a thermocouple 46 in the reflux line 28 which monitors the temperature of reflux and provides a current signal directly proportional to this temperature; a reflux flow transmitter 48 in the reflux line 28 which monitors reflux flow rate and provides a current signal directly proportional to the square of reflux flow rate; a distillate flow transmitter 50 in the distillate line 30 which monitors distillate flow rate and provides a current signal directly proportional to the square of the distillate flow rate; a heat flow transmitter 52 in the steam line 22 which monitors the flow of heat into the tower and provides a current signal directly proportional to the square of the heat flow rate; a bottoms level transmitter 54 which monitors the liquid level in the bottom of the tower and provides a current signal proportional to this level as the level varies between high and low limits; a feed flow transmitter 56 in the feed line 16 which monitors the flow rate of feed into the tower and provides a current signal directly proportional to the square of feed flow rate; a bottoms flow transmitter 58 in the bottoms line 32 which monitors the flow rate of bottoms and provides a signal directly proportional to the square of this flow rate; and a chromatagraphic analyzer 60 which provides a signal representative of distillate product composition. The signals from these monitoring stations are transmitted to the various control modules which comprise the control unit 10 of our invention. These modules are: a reflux flow controller module 62, a distillate flow controller module 64, a bottoms flow controller module 66, a heat flow controller module 68, a reflux control module 70, a pressure controller module 72, a composition analyzer interface module 74, a composition controller module 76, a temperature controller module 78, a divider module 80, an override module 82, a calibrator control module 84, a calibrator module 86, and a feed lag module 88.

Each module is a separate circuit made of solid state components. Thus these modules are compact and readily mounted in a relatively small console housing 90 (FIG. 2). The housing 90 includes a back door (not shown) that provides easy access to the various modules. The control panel 92 of our control unit 10 is shown in FIG. 2. Mounted on this panel 92 for ease of observation and access by the operator are the various meter scales, manually operated switches and dials of the control modules, and signal lights. As an optional feature, the signals from the various monitoring stations are recorded by a trend recorder 93 with the recorder charts 93a being displayed on the control panel 92.

Our control unit 10 is of the feed forward type, where variations in feed flow rate or feed composition or both are anticipated and the reflux, distillate, bottoms, and heat flow rates are adjusted to compensate for these feed variations before such variations can upset tower operations. Specifically, each of the main flow controller modules 62, 64, 66 and 68 have set points 94, 95, 96, and 97, respectively, measure inputs 98, 99, 100, and 101, respectively, and control signal outputs 63, 65, 67 and 69, respectively. The flow transmitters 48, 50, 52 and 54, respectively in the reflux, distillate, heat and bottoms lines, transmit signals to the measure inputs 98 through 101 of their respective controller modules 62, 64, 66, and 68. The feed flow rate signal from the transmitter 56 in the feed line 16 and the feed composition or ratio control signal from the temperature controller module 78 indirectly govern the amplitude of the signals at the set point inputs 94 through 97. Control signals from the outputs 63 through 69 are forwarded to the respective transducers 37, 38, 40, 39 which open and close the valves 33 through 36 as control signals from the modules change in amplitude. The measure flow rate signals are representative of the actual flow rates in the various lines 28, 30, 22, and 32. Whenever there is a difference between signals at the measure and set point inputs to a flow controller module, the control signal output of this controller module changes in proportion to this difference, changing the controlled condition to restore the signal at the measure input to equality with the signal at the set point input.

For example, assume feed flow rate and composition change such that the signal to the distillate flow controller module set point input 95 was not equal to the signal to the measure input 99 of this controller module. If the set point input signal was greater than the measure input signal, this indicates that greater distillate flow is required to prevent tower upset. This difference in signals would be reflected by an increasing control signal at the output 65 which would be transmitted to the transducer 38, controlling the valve 34 in the distillate line 30 to cause this valve to open further. This valve 34 would be opened until signals at the set point measure inputs 95 and 98 are equal.

In accordance with our invention, any variations in feed flow rate or feed composition are anticipated by our control unit 10 and corrective action is taken before such variations can upset tower operations. This corrective action is accomplished by interconnecting the various modules into four principal control systems:

the divider system 104 (FIG. 3), the reflux controller system 106 (FIGS. 4 and 5), the pressure controller system 108 (FIG. 6), and the override system 110 (FIGS. 8 through 12).

Divider System

Figure 3:
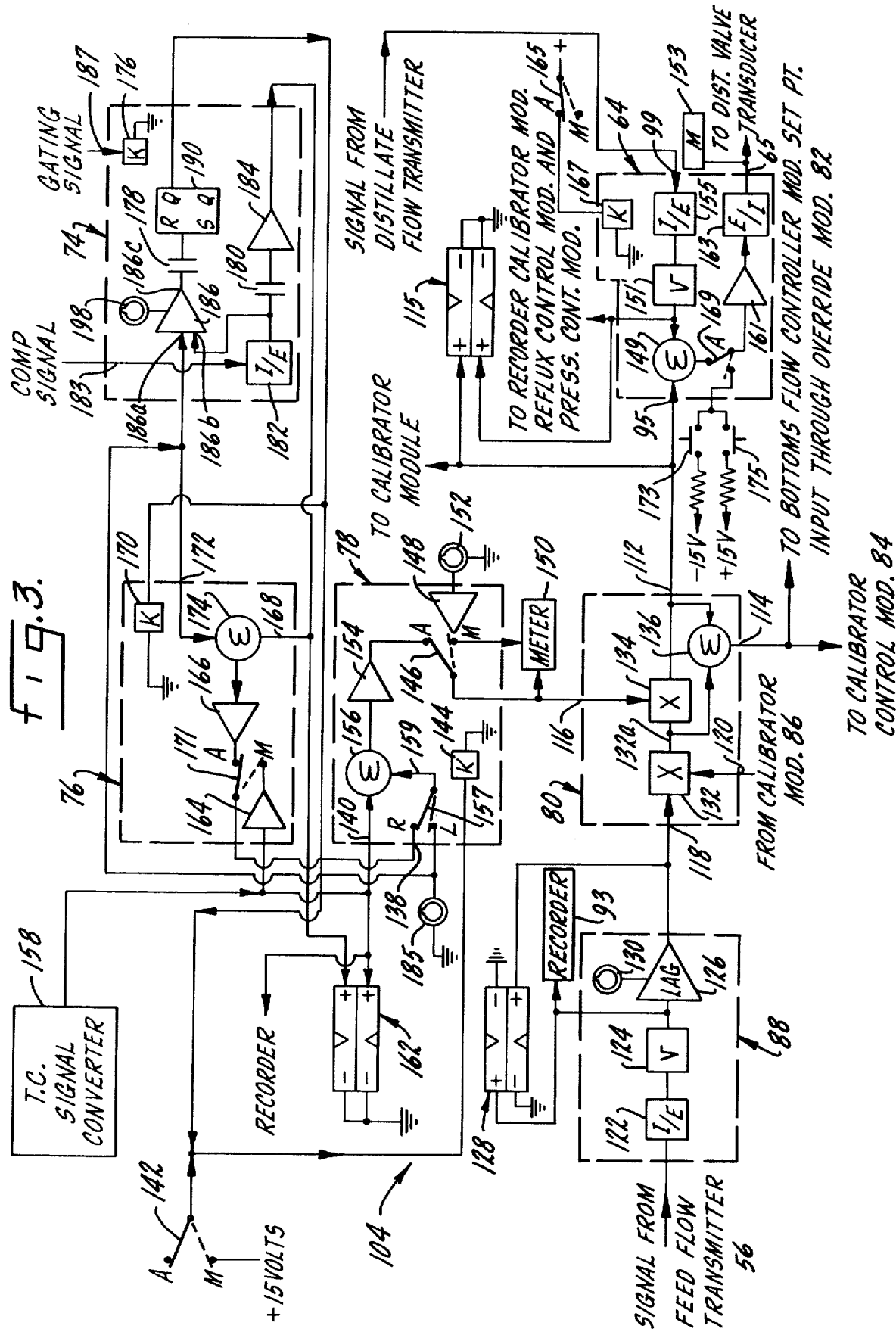
FIG. 3 is a schematic drawing of our divider system.

The divider system 104 shown in FIG. 3 controls the split of the feed between distillate and bottoms. This system 104 includes the feed/lag module 88, the divider module 80, composition analyzer innerface module 74, composition controller module 76, temperature controller module 78, and the distillate flow controller module 64.

Referring to FIG. 3, the feed signal from the flow transmitter 56 in the feed line 16 is forwarded to the feed/lag module 88 before being transmitted to the divider module 80. The feed/lag module 88 includes a conventional current to voltage converter 122 which converts the current signal from the feed flow transmitter 56 to a voltage signal. Since the signal from the flow transmitter 56 is a function of the square of the feed flow rate, a square root extraction is made of this signal to convert it to a linear signal. A conventional square root extractor circuit 124 performs this operation. The output signal from this extractor 124 is forwarded to a conventional operational amplifier 126, and a feed flow meter 128 and the trend recorder 93. The scale 129 of meter 128 is displayed on control panel 92 (FIG. 2). The amplifier 126 lags the signal from extractor 124 by a time factor set by a manually adjusted control dial 130. This module 88 is designed in accordance with conventional practice, lagging the feed signal slightly so that any changes in valve positions are made precisely at the correct time. Such lagging is required because of the inherent time lag due to the capacity of the tower 12. Even though there is a change in feed flow rate, this change will not immediately affect the operation of the tower 12. Consequently, the valves 33, 34, 35, and 36 must be opened or closed at a time subsequent to the change in feed flow rate. The feed/lag module 88 effectuates such a delayed change in valve operation.

The divider module 80 controls the amplitude of the signals to the set point inputs 95 and 96 of the distillate and bottoms flow controller modules 64 and 66. The divider module 80 has three inputs 116, 118, and 120 and two outputs 112 and 114. The signal from the output 112 is representative of the percent of the feed to be separated as distillate. The signal is transmitted to the set point input 95 of the distillate flow controller module 64. It is also transmitted to meter 115 having its scale 117 displayed on control panel 92 and the calibrator module 86. The signal from the other output 114 is representative of the percent of the feed to be separated as bottoms. It is transmitted to the calibration control module 84 and the set point input 96 of the bottoms flow controller module 66 through the override module 82. The signal at the input 118 comes from the feed/lag module 88. The signal at the input 116 comes from the temperature controller module 78. The signal at the input 120 comes from the calibrator module 86. Three process conditions determine the amplitude of the signals at these inputs 116, 118, 120. They are the feed flow rate, the composition of feed, and the liquid level in the bottom of the tower 12. When the feed flow rate increases, both the distillate and bottoms flow rate increase since more distillate and bottoms will be produced as quantity of feed to the tower 12 increases. When the feed flow rate decreases, both bottoms and distillate flow rate decrease. This relationship holds true provided the feed composition remains constant. If feed composition changes, the signals from the divider module 80 to the set points of the distillate and bottoms flow controller modules 64 and 66 will be changed to reflect this change in feed composition. The divider module 80 is calibrated so that the signal to the bottoms flow controller module 66 will insure a bottoms flow rate that maintains the liquid level in the tower 12 within predetermined limits. If the relationship between the signal at the set point 96 of the bottoms flow controller 66 and the liquid level signal from the level transmitter 54 indicate that these level limits are in danger of being exceeded, the divider module 80 is recalibrated and the override module 82 is switched to an override state. This important feature of our invention will be discussed below in detail in connection with the override system 110.

The divider module 80 includes two conventional multipliers 132 and 134 and a conventional adder or summer 136. The amplitude of the output signal of either multiplier 132 or multiplier 134 is equal to the multiple of their respective input signals divided by a preselected transfer factor. This relationship is expressed by the equation:

$$(1)\ \text{Multiplier Output} = \frac{\text{1st Multiplier Input} \times \text{2nd Multiplier Input}}{\text{Transfer Factor}}$$

One input to the first multiplier 132 is the lagged feed signal from the feed/lag module 88. The other input to this multiplier is the calibration signal from the calibrator module 86. As mentioned above, the calibration feature of our invention will be described in detail later in connection with the override system 110. Suffice it to say now that the two input signals to this first multiplier 132 control the signal at the output 132a of this multiplier 132 as a function of the feed flow rate and a calibration factor.

The output 132a of the multiplier 132 is one inpput to the second multiplier 134 and one input to the summer 136. The signal at the other input to the second multiplier 134 is the output signal from the temperature controller module 78. This signal from the temperature controller module 78 is the ratio control signal and it is a function of the feed composition. If this composition changes, this ratio control or input signal to the second multiplier input 116 of the divider module 80 will vary accordingly.

The summer 136 in the divider module 80 compares the output signals from the two multipliers 132 and 134 and provides an output signal equal to the difference between these output signals. This summer 136 is designed such that the signal at the output 132a of the multiplier 132 is multiplied by a factor of two by the summer. The output signal of the second multiplier 134 is forwarded directly to the set point input 95 of the distillate flow controller module 64, and the output signal of the summer 136 is forwarded through the override module 82 to the set point input 96 of the bottoms flow controller module. The summer output signal is also transmitted to the calibrator control module 84. In the system 104 illustrated the output signal from the summer 136 ranges between 0 and 10 volts.

To illustrate how the divider module 80 operates, assume that the input signals to this module range between 0 and 10 volts, and the transfer factor of the multiplier 132 is 5 volts and the transfer factor of the multiplier 134 is 5 volts. From equation (1), if the override system 110 is adjusted so the calibration signal is 5 volts, the output signal of the first multiplier 132 will equal the signal from the feed/lag module:

$$\text{Output of Multiplier } 132 = \frac{\text{1st Input of Multiplier } 132 \times 5}{5}$$

In other words, the lagged feed signal is one input to the second multiplier 134. At a given feed composition, if the signal from the temperature controller 78 applied to the other input of this second multiplier 134 is 5 volts, then, from equation (1):

$$\text{Output of Multiplier } 134 = \frac{\text{Lagged feed signal} \times 5}{5}.$$

That is, the output of this multiplier 134 will be equal to the lagged feed signal, which is applied to the set point input 95 of the distillate flow controller module 64. The summer 136 subtracts this set point signal from twice the calibrated lagged feed signal at output 132a. This determines the amplitude of the signal at the set point input 96 of the bottoms flow controller module 66. In this instance it also equals the lagged feed signal. Note the ratio of the set point signals is exactly 1:1, or 50 percent of the feed is removed from the tower 12 as distillate and 50 percent is removed as bottoms. If feed flow rate changes, both distillate and bottoms flow rates change in direct proportion thereto, maintaining the 1:1 ratio.

Assume that the composition of the feed changes and the input of the second multiplier 134 from the temperature controller module 78 is now 4 volts instead of 5 volts. Thus, from equation (1)

$$\text{Output of Multiplier } 134 = \frac{\text{Lagged feed signal} \times 4}{5}.$$

The summer again subtracts this signal from twice the calibrated lagged feed signal (2 feed signal −4/5 feed signal = 6/5 feed signal). Thus, the ratio of signals to the distillate and bottoms flow controllers equals:

$$\frac{\frac{4}{5} \text{ feed signal}}{\frac{6}{5} \text{ feed signal}} \text{ or } 4:6$$

In other words, this change causes a readjustment in split between distillate and bottoms so that 40 percent of the feed is removed from the tower 12 as distillate and 60 percent of the feed is removed as bottoms. As long as the feed composition does not again change, this new ratio of 4:6 will control the split between distillate and bottoms. Feed flow may increase or decrease without changing this ratio.

Composition Control

As feed composition changes, the split between distillate and bottoms must change in order to meet product specifications. Temperature of the material at the upper part of the tower 12 is representative of the overhead product purity provided the tower pressure is constant. However, if the difference between the boiling point of the distillate and bottoms is very small, exact control can be achieved only through analyzing either the distillate or the bottoms composition and using this measurement as a means to control the signal to the input 116 of the divider module 80.

Our preferred divider system 104 is designed to control the split where the difference in boiling points between distillate and bottoms is slight. It includes the temperature controller module 78, the composition controller module 76, and the composition analyzer innerface module 74. However, the composition controller module 76 and the composition analyzer innerface module 74 are optional features, since the temperature controller alone can be used to regulate the signal to the input 116 if the difference between the boiling point of the distillate and bottoms is relatively large or if the product specifications do not call for close separation of distillate and bottoms products.

The temperature controller module 78 governs the amplitude of the control signal to the input 116. This module includes a relay 144 including its contact 146, and an operational amplifier 148 having its input connected to a DC power source (not shown) through a variable resistor (not shown). The position of the resistor's slider is set by a manually adjusted dial 152. When the relay contact 146 is in the position indicated by dotted lines, the output of amplifier 148 is connected to input 116 through this relay contact. The temperature controller module 78 also includes another operational amplifier 154 having its output connected to the input 116 through the relay contact 146 when the contact is in the position shown by solid lines. The input to amplifier 154 is connected to the output of a summer 156. An input 140 to the summer 156 is the measure input of the temperature controller module 78. An input 138 to this summer 156 is the set point input of module 78.

This temperature controller module 78 has a manual mode of operation and an automatic mode of operation. A switch 142 on the control panel 92 determines the mode of operation. With the switch 142 in the manual position as indicated by the dotted lines, the relay 144 in the module 78 is actuated. This closes the relay contact 146 so that the output of the operational amplifier 148 is fed to the input 116 of the divider module 80. In the manual mode, a deviation meter 150 is connected between the amplifier 148 and the input 116, and since the signals to both sides of the meter are equal, the meter indicator needle 151 shown in FIG. 2 will be exactly centered on the meter's scale 153. The operator, by adjusting the dial 152, can either increase or decrease the amplitude of the signal applied to input 116 of the divider module. Nominally this signal ranges between 0 and 10 volts, which will command 0 and 100 percent distillate flow, respectively.

In the automatic mode, the relay 144 is de-energized so that contact 146 couples the output of the operational amplifier 154 to the input 116 of the temperature controller module 80. The summer 156 compares the signals at the measure input 140 and the set point input 138. The signal to the measure input 140 is the temperature signal from the thermocouple 42 at the upper part of the tower 12. This temperature signal is indicative of overhead composition. It is a millivolt signal which is converted by a thermocouple signal converter 158 to a strong voltage signal and applied to the measure input 140 of the temperature controller 78. This signal is also forwarded to the trend recorder 93, the temperature measure input of a meter 162, and to an operational amplifier 164 in the composition controller module 76. As will be explained in detail below, in the manual mode a signal equal to this temperature signal and forwarded through the composition controller module 76, serves as the set point signal of the temperature controller module 78.

Any difference between signals at the inputs 138 and 140 will cause the output of the amplifier 154 to change in proportion to this difference to alter conditions so that the signals will be restored to equality. When the tower 12 is operating efficiently, the temperature of the overhead material remains constant for a feed of a given composition. Under these conditions, the signals at the set point input 138 and the measure input 140 of the temperature controller module 78 are equal. If the feed composition changes, the temperature of the overhead will begin to change. The thermocouple 42, monitoring this change, transmits a signal to the measure input 140 which is different from the signal at the set point input 138. The summer 156 generates a signal which causes the output of the amplifier 154 to increase or decrease. This signal from the amplifier 154 thus changes, changing the split between the distillate and bottoms until the signal at the measure input 140 is once again equal to the signal at the set point input 138. That is until the split between the distillate and bottoms has been readjusted to accommodate the change in feed composition.

The set point signal to the summer 156 may be set manually or automatically as a function of distillate composition. If set manually, a switch 157 is switched to connect the input 159 of the summer 156 to a DC power source (not shown) through a variable resistor (not shown). The position of the resistor's slider is controlled by a temperature/composition dial 185 which is mounted on the control panel 92. In many instances, especially when the difference between boiling points of distillate and bottoms is relatively great, such manual control of the set point signal to the temperature controller module 78 is satisfactory, and the composition controller module 76 and the composition analyzer innerface module 74 are not needed.

As illustrated in FIG. 3, the signal at the set point input 138 comes from the control module 76 and it is representative of the desired distillate composition. This signal from module 76 is called the product signal. As long as the tower 12 produces distillate product meeting specifications, the product signal at the set point input 138 will remain at a predetermined value as governed by the composition controller module 76. If for some reason the analyzer 60 malfunctions, the temperature controller module 78 will be switched over to the manual mode of operation, enabling the operator to manually adjust the signal to the input 116 of the divider module 80 to restore tower operations to make a product meeting specifications.

The module 76 includes the operational amplifier 164, another operational amplifier 166, a summer 174 and a relay 170 including its contact 171. In the automatic mode, the output of the amplifier 166 is connected through the contact 171 to set point input 138. This output signal from amplifier 166 remains constant so long as the signals to the measure input 168 and set point input 172 of the summer 174 are equal. The signal to the measure input 168 is the output signal from composition analyzer innerface 74. This signal from the innerface module 74 is also transmitted to the composition meter 162. The signal to the set point input 172 is regulated by the temperature/composition dial 185 on the control panel 92. The operator, by adjusting the dial position, regulates the input signal at the input 172. Provided the signals at inputs 172 and 168 are equal, the summer 174 in the temperature controller module 76 has a zero output signal which is applied to operational amplifier 166. Whenever there is a difference between the signals at inputs 172 and 168, the summer 174 will generate an output signal causing the amplifier 166 to alter its output signal. Such a change results in a change in the signal to the set point input 138 of the temperature controller module 78. The signal from the summer 174 will continue to change until conditions have been altered to restore the signals at inputs 172 and 168 to equality.

In accordance with one feature of our invention, the composition signal from the analyzer 60 can fluctuate within predetermined limits, but when it exceeds these limits the temperature controller module 78 and the composition controller module 76 are switched to manual mode of operation. The composition analyzer innerface module 74 controls the switching function. It includes a relay 176 having two contacts 178 and 180, a current to voltage converter 182, a sample and hold circuit 184, a comparator 186 and a bistable multivibrator 190. The composition analyzer 60 (FIG. 1) samples the distillate product stream and analyzes the distillate composition to generate several peak signals which are forwarded to the analyzer innerface module 74 at an input 183. Only one of these peak signals is used as the composition test signal. Selection of the composition test signal is accomplished by generating and transmitting a gating signal to the analyzer innerface module 74 at input 187. The gating signal is timed so that the peak signal serving as a measure of composition is received prior to the gating signal and checked for deviation by the innerface module 74. The gating signal energizes the relay 176 to close the contacts 178 and 180. The composition signal, a current signal is converted by the current to voltage converter 182 to a voltage signal and transmitted through the closed contact 180 to the sample and hold circuit 184 and the comparator 186. The sample and hold circuit 184 is simply a capacitor in the input circuit of an operational amplifier so the last signal into the circuit 184 is equal to the output signal from this circuit.

Switching to the manual mode occurs automatically when comparator 186 determines that the new composition signal from the converter 182 deviates excessively from the desired composition indicating a malfunction of the analyzer 60. This comparator 186 has two inputs 186a and 186b. The input 186a receives a zero to +10 voltage DC signal depending upon the position of the dial 185. This dial position is manually set according to the desired composition. The input 183 receives the composition signal from the converter 182. When the signals at the inputs 186a and 186b are within the set limits as governed by the setting of a control dial 198, there is a zero signal at the output 186c of the comparator 186. Thus the control dial 198 for the comparator 186 determines the percent deviation that the composition signal may vary from the predetermined set point of the dial 185.

The multivibrator 190 has two states depending on whether or not the signal from comparator 186 is within the set deviation. If the composition signal is drastically different from the set point signal at input 186a, the comparator 186 will have an output signal other than zero, causing the multivibrator 190 to change states to generate a flunk signal. This flunk signal is transmitted to the composition controller module 76 and the temperature controller module 78 to actuate relays 170 and 144. This closes contact 171 in module 76, contact 146 in module 78, and contact 171 in module 76 to switch the divider system 104 to the manual mode of operation.

In the manual mode, the operator controls the signal to the input 116 of the divider module 80. By adjusting the dial 152, the operator regulates the amplitude of the signal to the input of the operational amplifier 148. The output of this amplifier 148 provides a signal to the input 116 of the divider module 80. Note the divider system 104 is in the manual mode when either switch 142 is moved to the manual position or a flunk signal is generated by the composition analyzer innerface module 74. Thus, if composition signal from the composition analyzer 60 indicates that the analyzer 60 malfunctions, the signal at input 116 will be under manual control.

In the manual mode, the signals at the set point input 138 and the measure input 140 of the temperature controller module 78 are equal. Note the temperature signal from the thermocouple converter 158 is applied to the input of the operational amplifier 164. The signal at the input of this amplifier 164 is equal the temperature signal and it is transmitted through the relay contact 171 to the set point input 138 of the temperature controller 78. Consequently, if the operator makes an adjustment in tower operations causing the temperature signal to vary, this is tracked so that on switching back to automatic, there will be a bumpless, balanceless transfer.

In the automatic mode, one side of the deviation meter 150 is connected through the operational amplifier 148 to the control dial 152. The other side of this meter 150 is connected to the output of amplifier 154 through contact 146. The output signals from amplifiers 148 and 154 will be equal provided the operator occasionally resets the dial control 152. If the operator does this, the deviation meter 150 will be balanced. The operator will note an unbalanced condition by simply observing the indicator needle 151 on the deviation meter 150 in an off center position. Thus, if the analyzer innerface module 74 provides a flunk signal, turning control of divider module 80 over to manual, the input signal to the divider module 80 will be the last signal occuring during the automatic mode of operation. Thus a smooth transition will be achieved provided the operator from time to time adjusts dial 152 so that the deviation meter indicates there is a balance between the output signals from amplifiers 154 and 148.

Distillate Flow Controller

The distillate flow controller module 64 includes a summer 149, a square root extractor 151', a current to voltage converter 155, a conventional operational amplifier 161, and a voltage to current converter 163. A valve meter 153 follows the signal from the converter 163, and the meter's scale 147 is displayed on the control panel 92. The meter's pointer 145 indicates valve position. The summer 149 compares the flow rate signal from the divider module 80 with the signal from the distillate flow transmitter 50 after this signal has passed through the current to voltage converter 155 and the square root extractor 151'. If these signals are not equal, the summer 149 generates an output signal which is transmitted to the operational amplifier 161. The signal from the amplifier 161 is transmitted through the voltage to current converter 163 to transducer 38 which operates the distillate valve 34. As long as there is a signal from the summer 141, the operational amplifier 161 will increase or decrease its output signal until the signal from the summer is zero. When this occurs, the operational amplifier 161 will hold its output constant until it receives another signal from summer 149.

The distillate flow controller module 64 has a manual and automatic mode of operation. A switch 165 controls the mode of operation of thus module 64. As shown, the module 64 is in the automatic mode of operation. Switching the switch 165 to a contact M, switches the module 64 to the manual mode. This energizes a relay 167 having a relay contact 169. This contact 169 closes to the dotted position when the relay 167 is energized. In the manual mode, the input signal to the operational amplifier 161 is generated in response to the closure of either push button 173 or 175. These push buttons 173 and 175, respectively, connect the amplifier 161 to either a negative or positive 15 volt source. Closing push button 173 drives the amplifier 161 to open the valve. Closing push button 175 drives the amplifier 161 to close the valve. The switch 165 and push buttons 173 and 175 are mounted on control panel 92 for ease of access to the operator.

The construction of the reflux flow controller module 62 and the bottoms flow controller module 66 is identical to that of the distillate flow controller module 64. These modules 62 and 66 include flow meters, 115a and 115b and valve meters 153a and 153b, respectively, having their scales 117a and 117b and 147a and 147b displayed in panel 92. These modules 62 and 66 also have a manual and automatic mode of operation with switches 165a and 165b and push buttons 173a, 175a and 173b and 175b mounted in the control panel 92.

Reflux Controller System

Figure 4:
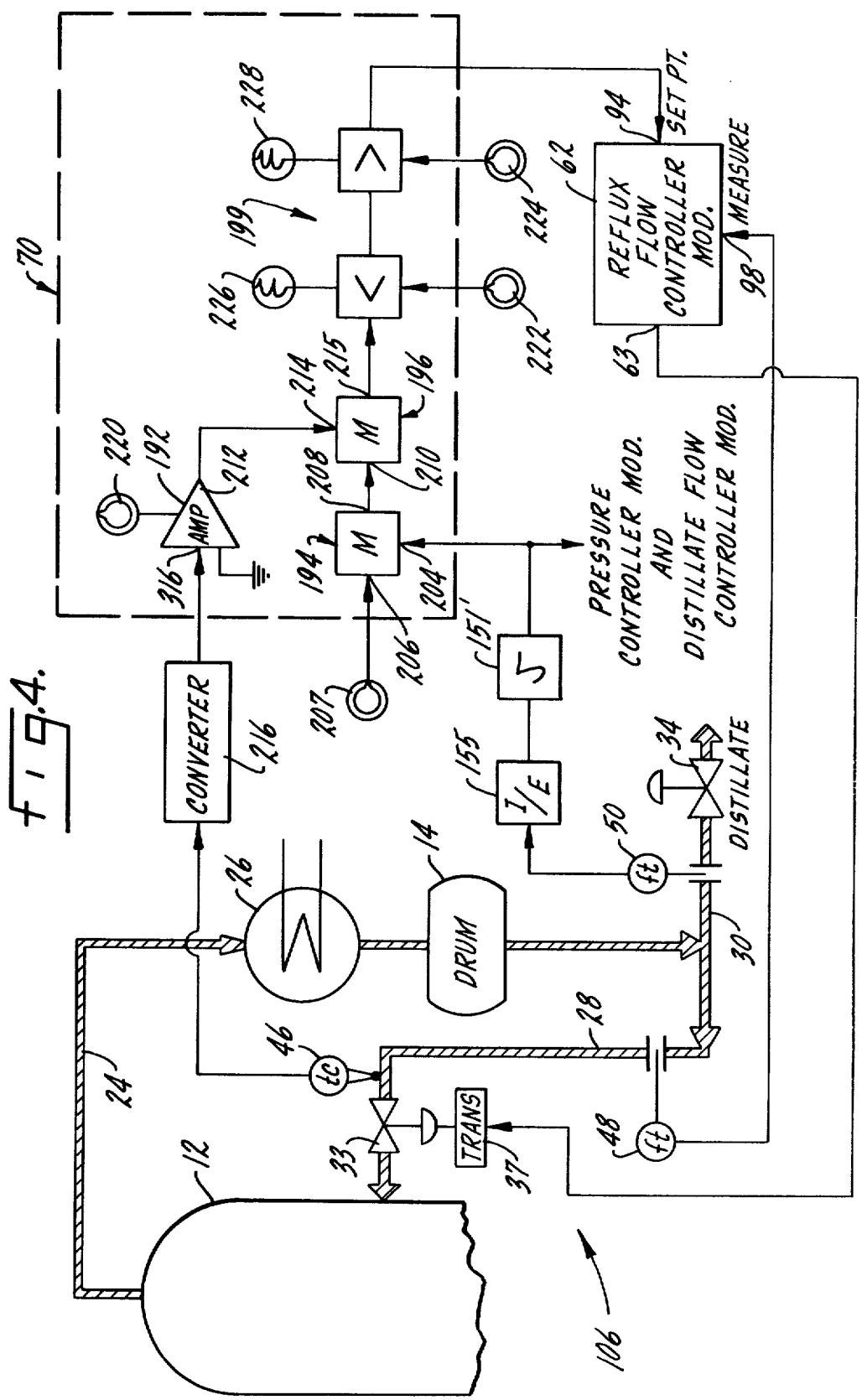
FIG. 4 is a schematic drawing of our reflux controller system.
Figure 5:
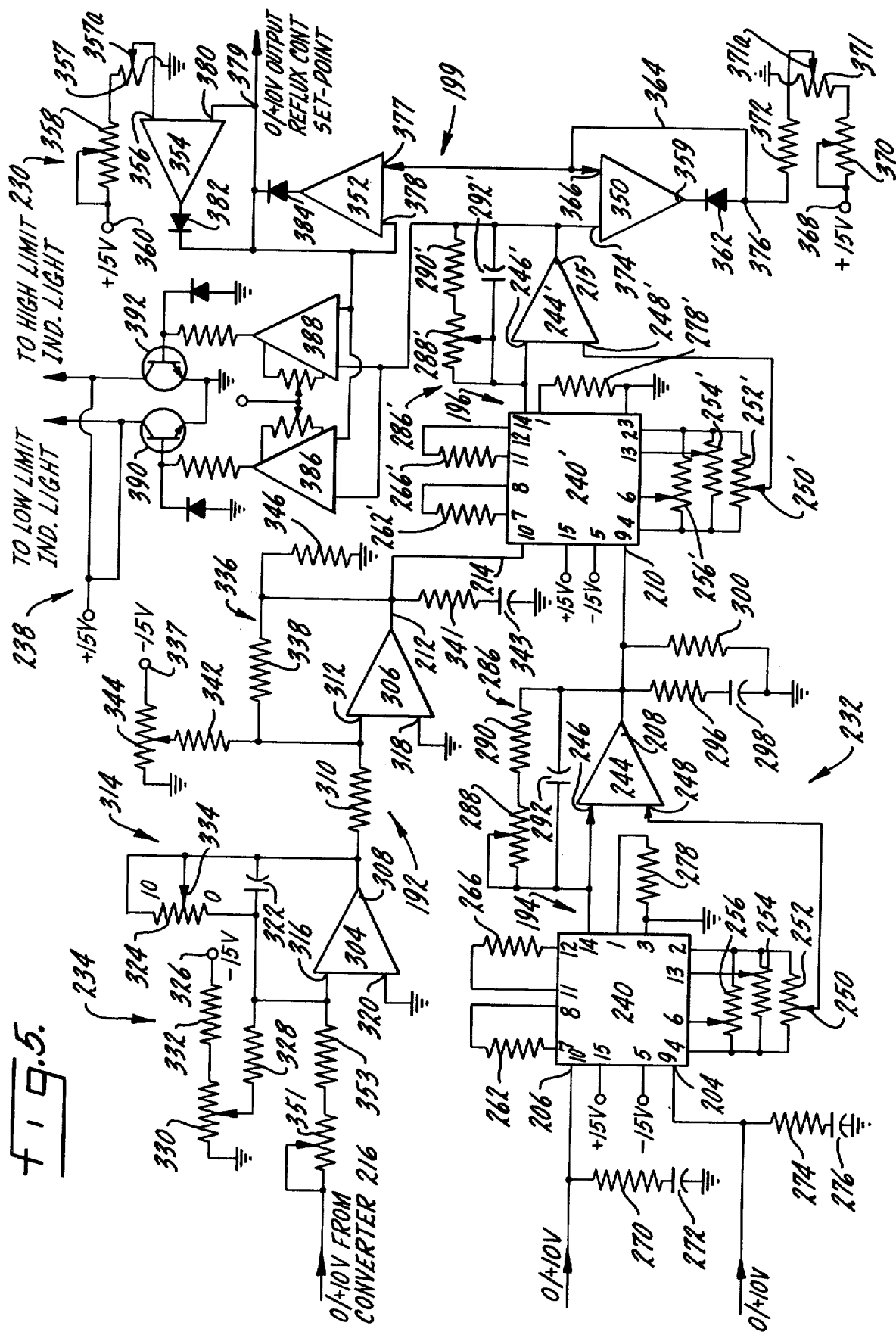
FIG. 5 is a circuit diagram of the reflux control module shown in FIGS. 1 and 4.
Figure 6:
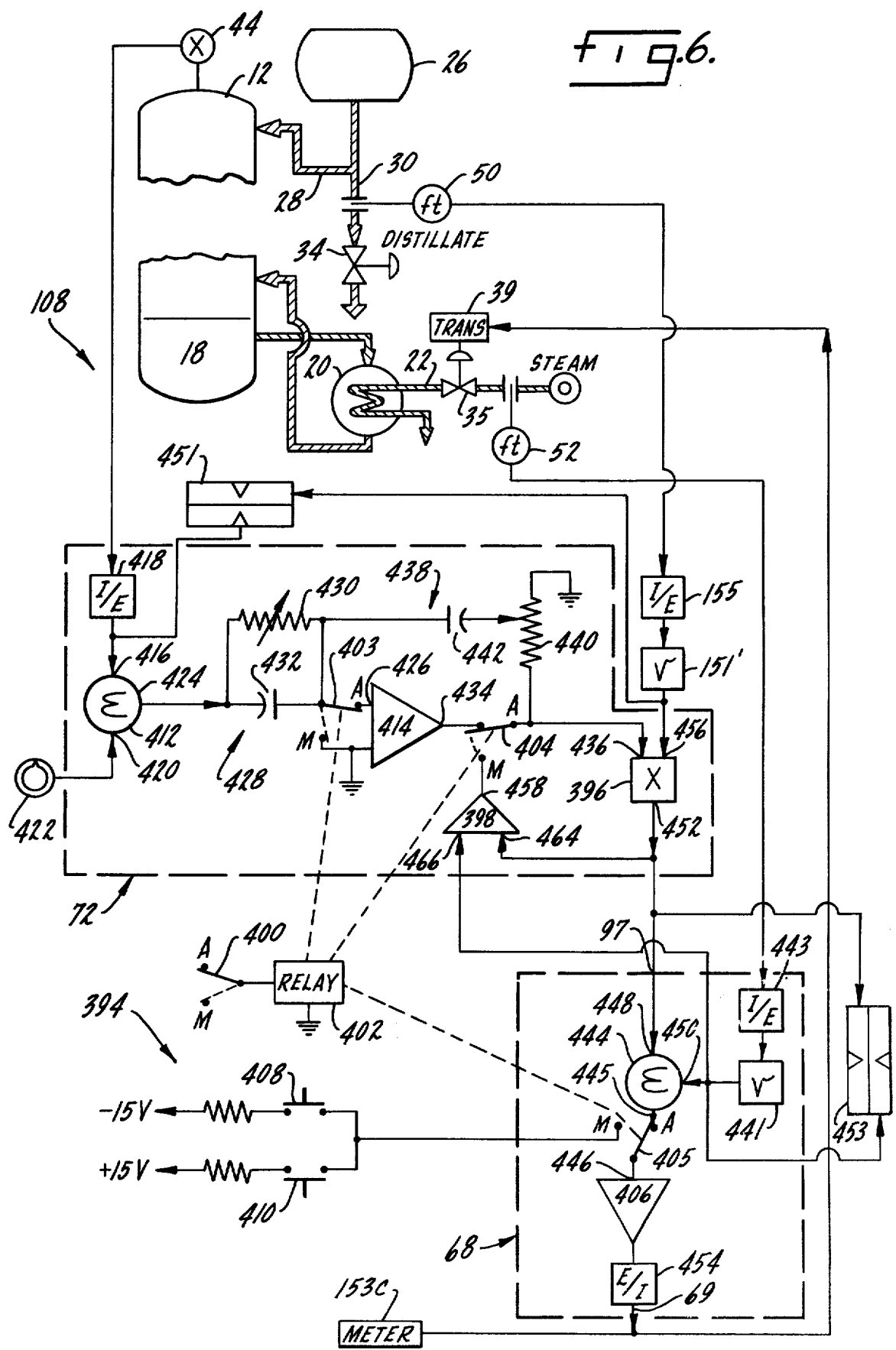
FIG. 6 is a schematic drawing of our pressure controller system.
Figure 7:
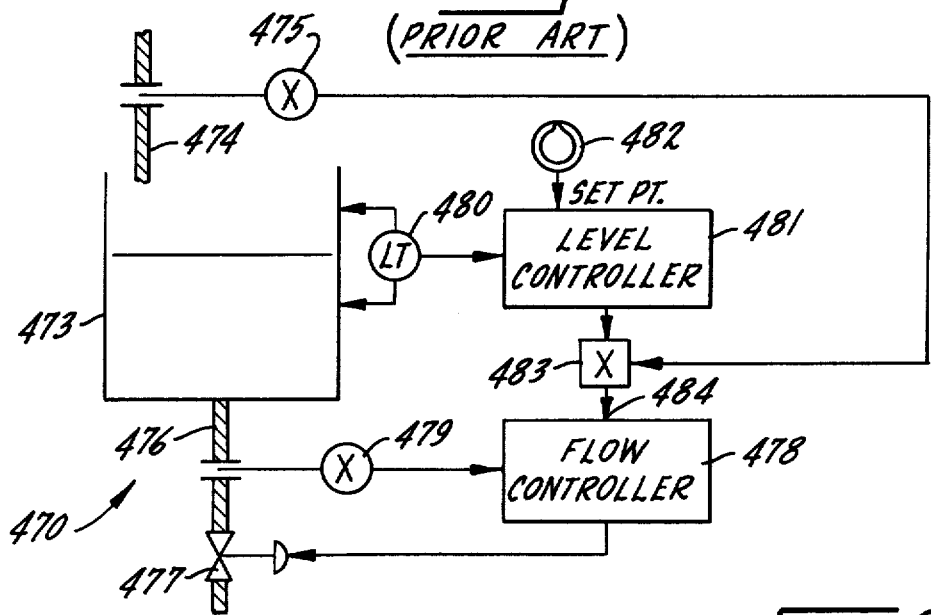
FIG. 7 is a schematic drawing of a prior art level control system.

Our reflux controller system 106 is illustrated in FIGS. 4 and 5 as controlling the flow of reflux to the fractionation tower 12. In our reflux control system 106, the reflux flow rate is a function of distillate flow rate and reflux temperature. As the distillate flow rate increases, the reflux flow rate is increased. Conversely, as distillate flow rate decreases, reflux flow rate decreases. When the reflux temperature is at a predetermined standardized temperature, the reflux flow rate and distillate flow rate are directly proportional to each other. As reflux temperature deviates from the standardized temperature, reflux flow rate is corrected for deviation from the standard temperature.

The reflux controller system 106 includes the conventional reflux flow controller module 62, reflux control module 70, flow transmitters 48 and 50, respectively in the reflux and distillate lines 28 and 30, and the thermocouple 46 monitoring reflux temperature. The reflux flow controller module 62 has the set point input 94, the measure input 98, and the control signal output 63 where any difference in input signals causes the control signal to change in proportion to this difference until conditions are corrected to restore its input signals to equality. The control signal determines the position of the valve 33 in the reflux line 28 and valve position changes as the control signal changes. The flow transmitter 48 in the reflux line monitors reflux flow rate and provides a current signal proportional to the square of this flow rate. The flow transmitter 50 in the distillate line monitors the flow rate of distillate and provides a current signal proportional to the square of distillate flow rate. The thermocouple 46 generates a millivolt signal directly proportional to reflux temperature. The temperature signal and distillate flow rate signal determine the amplitude of the signal applied to the set point input 94 of the reflux flow controller module 62.

More specifically, the distillate and temperature signals are transmitted to the set point input 94 through the reflux control module 70 which includes an operational amplifier 192, multipliers 194 and 196 and a high/low limit circuit 199. The signal from the distillate flow transmitter 50 goes through the conventional current to voltage converter 155 and the square root extractor 151' in the distillate flow controller module 64, and is applied to one input 204 of the multiplier 194 as a voltage signal directly proportional to distillate flow rate. There is applied to the other input 206 of the multiplier 194 a voltage signal which may be manually or automatically adjusted as required by parameters of the system. The voltage signal applied to the input 206 is from a DC power source (not shown) coupled to the input 206 through a variable resistor (not shown). The dial 207 adjusts the slider of the resistsor to control the amplitude of the voltage signal. This dial 207 is on control panel 92 (FIG. 2). The signal at the output 208 of the multiplier 194 is applied to one input 210 of the multiplier 196. The signal at the output 212 of the operational amplifier 192 is transmitted to the other input 214 of the multiplier 196. The output 215 of multiplier 196 is connected to the high/low limit circuit 199. As conventional, the output signals of the multipliers 194 and 196 are equal to the multiple of the input signals divided by a preset transfer factor.

The distillate flow rate signal is the basic signal for controlling the set point input signal to the reflux flow controller module 62. The amplitude of the distillate flow rate signal is determined by the amplitude of the signal at output 112 of the divider module 80. As the distillate signal changes indicating more or less distillate is being withdrawn from the condenser drum 14, it will cause the valve 33 in the reflux line 28 to open or close to produce a proportional change in reflux flow rate. If more distillate is withdrawn from the condenser drum 14, more reflux will be recycled to the top of the tower 12 and vice versa. The distillate flow rate signal from transmitter 50 is modified by the reflux temperature signal. For example, assume the reflux temperature range is normally between 0° and 150°F. The midpoint of this range is 75°F or normal ambient temperature. If the reflux is 75°F, the standard temperature, the distillate flow rate signal will determine whether reflux flow rate is increased or decreased. As reflux temperature deviates from 75°F, the signal to the set point input 94 of the reflux flow controller module 62 is adjusted to reflect this deviation in reflux temperature.

More specifically, the signal from the thermocouple 46 is a millivolt signal which is amplified by a thermocouple signal converter 216. This voltage signal is applied to the inverting terminal 316 of the operational amplifier 192. As this signal changes, the output of the amplifier changes to alter the output signal of the multiplier 196. For example, in the system illustrated, the input signals to these multipliers 194 and 196 range between 0 to 10 volts and the transfer factor is 5 volts. Assume that at a reflux temperature of 75°F the output of the operational amplifier is 5 volts. Thus, substituting these values in the equation (1):

$$\text{Multiplier Output} = \frac{\text{1st Multiplier Input} \times 5}{5}$$

or the signal at the output 215 of the multiplier 196 will be equal to the signal at input 210. In other words, the temperature signal will have no effect on the signal to controller set point input 94 when the reflux temperature is at the standard temperature of 75°F. So long as the reflux temperature remains at 75°F, the distillate signal will have total control over the signal at set point 94.

Assume the reflux temperature drops 10°F to 65°F because of a sudden rain shower affecting the operation of the condenser 26. Because the reflux temperature is lower, less reflux should be forwarded to the top of the tower 12, otherwise tower pressure will drop due to the excessive cooling capacity of the reflux. For instance, at a reflux temperature of 75°F, a given quantity of reflux will have a constant heat content and will be adequate to condense the vapors at the top of the tower 12 without excessive cooling that would result in loss of tower pressure. As more distillate is withdrawn, more vapors leave the top of the tower 12 and more reflux will be required. This relationship can be expressed as equation (2):

(2) $\quad$ Reflux rate $= K_t$ Distillate Rate.

As long as reflux temperature is 75°F, K is constant. At 65°F there is still a direct proportional relationship between distillate flow rate and reflux flow rate, however, the value of $K_t$ in equation (2) is different. If no correction is made for this different $K_t$ value, the same amount of reflux would be used at 75°F and excessive condensation of vapors would occur since the temperature of the reflux is lower by 10°F. This would cause a substantial drop in tower pressure, upsetting sewer operations. Consequently, in accordance with our invention, the distillate flow rate signal transmitted to the reflux flow controller module 62 is modified to take into account the deviations in reflux temperature from the standard reflux temperature.

The sensitivity of our reflux controller system 106 to changes in reflux temperature is determined by the position of a control dial 220 on the operational amplifier 192. Adjusting this dial 220 sets the gain of the amplifier 192. Dial setting will vary for each individual tower 12 and must be preset before our reflux controller system is operational. Dial setting is a direct indication of how much reflux flow rate will change for a full scale change in the temperature. For example, with the dial on 2.74 percent, a full-scale temperature change of 150°F will produce a 2.74 percent change in reflux flow rate. A 10°F change at this setting will produce a 0.19 percent change in reflux flow rate. If the dial is set at zero, reflux temperature changes will have no effect on flow rate. The dial setting may be determined by a simple calculation as illustrated*, or empirically by increasing the dial setting from zero while noting the effect that reflux temperature changes have on tower operations. By trial and error adjustments, the correct dial setting for a given reflux material is made. The method of applying reflux temperature compensation to the reflux flow rate is extremely simple and flexible since it avoids detailed calculations or painstaking calibrations. It is easy to change with the system 106 in service, should this be necessary. If desired, the temperature input may be the differential between temperature at the top of the tower and the temperature of the reflux material.

*SAMPLE CALCULATION

Assume the distillate is n-butane, the overhead temperature of the n-butane is 168°F, the reflux temperature is 110°F, and the reflux flow rate is 9600 barrels per day. Under these conditions
$\Delta T = 168° - 110° = 58°$
Latent Heat = 165 BTU/lb
Specific Heat = 0.55
Heat Removed = latent heat of $C_4$ + ($\Delta T \times$ Specific Heat of $C_4$) × Flow Rate × lbs/gal×gal/bbl
(BTU/lb)         (°F) (BTU/lb)                    (bbl/day)
Heat Removed = [156 + (58 × .55)] × 9600 × 4.86 × 42 = 386 × 10⁶ BTU/day
If reflux temperature rises to 120°F, the reflux flow rate must equal 9870 barrels per day to remove same amount of heat removal.

That is 9870 bbl/day = $\dfrac{386 \times 10^6}{[156 + (\Delta T \times .55)] \times 4.86 \times 42}$, where $\Delta T = 168 - 120 = 48°F$.

Thus an increase in reflux temperature of 10°F requires an increase in flow of 270 bbl/day or a 1.81% increase. If a dial setting of 0% equals a temperature of 0°F and a dial setting of 100% equals a 150°F, then under the above conditions where n-butane is distillate, the correct setting of the dial would be 42%, i.e.

Dial Setting = $\dfrac{2.81\% \times 150°F}{10°F}$ = 42%

In accordance with another feature of our controller system 106, the high/low limit circuit 199 insures that the signals to the set point input 94 will be such that the tower 12 will be neither flooded nor go dry. The high limit of the circuit 199, regardless of the distillate flow rate signal the the temperature signal, limits a signal to the set point input 94 which insures that the control signal at output 63 opens the valve 33 in the reflux line 28 to a position where only a maximum amount of reflux can be returned to the tower 12. This helps prevent tower flooding. The low limit of the circuit 199, regardless of the distillate flow rate signal and reflux temperature signal, limits a signal to the set point input 94 which prevents the valve 33 from totally closing. This insures that the tower 12 will never become dry. The high and low limits of this circuit 198 are manually set dials 222 and 224. Lights 226 and 228 indicate when the high or low limit is in force. The dials 222 and 224, and lights 226 and 228 are on the control panel 92 (FIG. 2).

Reflux Controller Circuit

The circuit 230 of reflux control module 70 is illustrated in FIG. 5. This circuit has four chief subcircuits: (1) distillate flow rate signal transmission circuit 232, (2) reflux temperature signal transmission circuit 234, (3) high/low limit circuit 199, and (4) light control circuit 238.

The distillate flow rate signal transmission circuit 232 includes two conventional monolithic, transconductance integrated multiplier circuits 240 and 240' sold by Motorola Corporation. Integrated circuit 240 includes the inputs 204 and 206, respectively at pins 9 and 10 and an output at pin 14. The output signal of the circuit 240 is a current signal which is converted by an operational amplifier 244 to a voltage signal. This circuit 240 and amplifier 244 constitute the multiplier 194 of FIG. 4, and is illustrative of a conventional multiplier. The output at pin 14 is connected to the inverting terminal 246 of the amplifier 244. The noninverting terminanl 248 of the amplifier 244 is connected to the slider 250 of a 50 kilohm variable resistor 252. This resistor 252 is in parallel connection with 20 kilohm variable resistors 254 and 256. The sliders of these resistors 254 and 256 are connected, respectively to pins 13 and 6 of the circuit 240. The wipers of these resistors 252, 254 and 256 are adjusted so that when the signal to either input 204 and 206 is 0 volts, the output signal of the amplifier 244 will be 0 volts. A 62 resistor 262 is connected across pins 7 and 8 of the circuit 240 and 30 kilohm resistor 266 connected across pins 11 and 12 of the circuit. These resistors 262 and 266 roughly set the transfer factor of the multiplier 194 at 1/5 volts. A 0 to +10 volt calibration signal is applied to input 206 over a filter circuit including series connected 510 ohm resistor 270 and a grounded 10 picofarad capacitor 272. The amplitude of the signal at the input 206 is controlled by the setting of dial 207 which ranges from 0 to +10 volts. The distillate flow rate signal is applied to input 204 over a filter circuit including 510 ohm resistor 274 and 10 picofarad capacitor 276. The filter circuits dampen any oscillations in the signals applied to the inputs 204 and 206. The internal reference current of the integrated circuit 240 is controlled by a grounded 16 kilohm resistor 278 connected to pins 1 and 3. A +15 volt input is applied to the circuit 240 at pin 15 and a −15 volt signal is applied to pin 5. The output of the amplifier 244 is output 208. It is connected to its inverting terminal 246 through a feedback circuit 286 including series connected 20 kilohm and 90.9 kilohm resistors 188 and 290. In parallel with these resistors 288 and 290 is a 10 picofarad capacitor 292. This capacitor 292 passes only high frequency signals and serves to filter out electrical noise.

The integrated circuit 240' and its operational amplifier 244' are essentially the same as the detail wiring of circuit 240 and its amplifier 244, and the same components have been given the same number with a prime superscript. The only differences that need be mentioned is that the input 214 is at pin 10 of the circuit 240', the input 210 is at pin 9 of the circuit, and the output 215 is the output of the amplifier 244'. The output 208 is connected to pin 9 over the filter circuit including a 510 ohm resistor 296 in series connection with a grounded 10 picofarad capacitor 298 and grounded 10 kilohm resistor 300 in parallel with resistor 296. The output 215 is connected to the high/low limit circuit 199. Both of the multipliers 194 and 196 multiply the voltage input signals and divide by the transfer factor of 5 volts. Thus, for example, if there is a +5 volt signal at input 204 and a +5 volt signal at input 206 of circuit 240, the output of the amplifier 244 is 5 volts. This would also be true for the multiplier 196 which includes circuit 240' and the amplifier 244'.

The reflux temperature signal transmission circuit 234 includes the operational amplifiers 304 and 306 which constitute the amplifier 192 of FIG. 4. The output 308 of the amplifier 304 is connected through a 100 kilohm resistor 310 to the inverting terminal 312 of the amplifier 306 and through a feedback circuit 314 to its inverting terminal 316. The noninverting terminals 320 and 318 of both the amplifiers 304 and 306 are connected to ground. The feedback circuit 314 includes a 0.1 farad capacitor 322 and a 100 kilohm variable resistor 324 in parallel with capacitor 322. The slider 334 of resistor 324 is moved to different settings as the control dial 220 is manually adjusted. The inverting terminal 316 of the amplifier 304 is also connected to a −15 volt source 326 through a 100 kilohm resistor 328, a variable 10 kilohm resistor 330 and a 5.11 kilohm resistor 332. The output 212 is connected through a feedback circuit 336 including a 100 kilohm resistor 338 to the inverting terminal 312 of the amplifier 306. The inverting terminal 312 is also connected to a −15 volt source 337 through a 200 kilohm resistor 342 and a variable 10 kilohm resistor 344. A 10 kilohm resistor 346, connected to ground and the output 212 of amplifier 306 is a load resistor for leveling out the output signal of the amplifier 306. The output 212 is also connected through a filter circuit including 510 ohm resistor 341 and a 10 picofarad condenser 343 to input 214 of the multiplier 196. The reflux temperature signal, after passing through the current to voltage converter 216 is transmitted to the inverting terminal 316 of amplifier 304 through a 20 kilohm variable resistor 351 and a 90.9 kilohm resistor 353. This signal ranges between zero and +10 volts. When the temperature of the reflux is at 75°F or exactly midway between the range of 0° and 150°F, the signal from converter 216 will be +5 volts. At this voltage, the signal from the temperature transmission circuit 234 applied to the input 214 of multiplier 196 will be +5 volts. Since the transfer factor of the multiplier 196 is 5 volts, the temperature signal at 75°F will have no affect on the distillate flow rate signal being transmitted to the set point input 94 of the reflux flow controller module 62.

More specifically, there is normally applied a −5 volt signal to the inverting terminal 316 of the amplifier 304 through the resistor network including the resistors 328, 330, 332. The +5 volt signal applied to this terminal through the resistors 351 and 353 thus results in a net voltage input of zero at the inverting terminal 316. This is equal to the voltage at the noninverting terminal 320. So long as the voltage at these terminals are equal, the amplifier output is 0 volts. This 0 volt signal at output 308 is applied to the inverting terminal 312 of amplifier 306. There is also applied a −5 volt signal to this amplifier 306 through the resistor network including 342 and 344. This causes the amplifier 306 to generate a +5 volt signal at the output 212 which is applied through the feedback circuit 336 to equalize the −5 volt signal. This +5 volt signal is also transmitted to the input 214 of multiplier 196. With the transfer factor for multiplier 196 equal to 5 volts, the signal at input 210 of multiplier 196 will equal the output signal of this multiplier. So long as the temperature of the reflux is 75°F, the signal at input 214 will be +5 volts, and the signal at input 210 will equal the signal at output 215. Consequently, as distillate flow increases or decreases, the signal at output 215 will increaase or decrease as a function only of the distillate flow rate signal.

If the temperature signal from converter 216 is +7 volts indicating the reflux temperature is above 75°F, this +7 volt signal is applied to the inverting terminal 316 of the amplifier 304 along with the −5 volt signal. With the slider 334 at 10 of resistor 324, the amplifier 304 generates at its output 308 a −2 volt signal which is sent back through the feedback circuit 314 so that the resulting input to the inverting terminal 316 is 0 volts. This amplifier 304 will continue to generate a −2 volt output signal so long as there remains a +7 volt input signal from the converter 216. This −2 volt signal is applied to the input 312 of the amplifier 306. Consequently, the output 212 will increase by +2 volts from +5 to +7 volts, modifying the distillate flow rate signal by this temperature signal.

The sensitivity of the reflux controller system 106 to reflux temperature changes is governed by the position of the slider 334 of resistor 324. This slider position, as set by the dial 220, controls the affect reflux temperature will have on the signal to the set point input 94 to the reflux flow controller module 62 by controlling the gain of the amplifier 304. If the slider 334 is moved all the way down to zero position, this effectively dials out any compensating effect of the temperature signal. In other words, the output of the amplifier 304 will always be 0 volts regardless of the input signal. If the slider 334 is moved all the way up to position 10, the gain of the amplifier 304 will be at maximum. In other words, any change in reflux temperature from standard will have a maximum effect on the signal transmitted to the set point input 94 of the reflux flow controller module 62. Moving the slider 334 to different positions between the ten and zero position varies the effect of the reflux temperature from its maximum to its zero effect. As mentioned above, this position can be arrived at either empirically or through calculations depending on the reflux material.

The high/low limit circuit 199 includes operational amplifiers 350, 352 and 354. The low limit amplifier 354 has its noninverting terminal 356 connected through a kilohm variable resistor 357 and a 10 kilohm variable resistor 358 in the reflux control module 70 to a +15 volt source 360. The position of the slider 357a of the resistor 357 is controlled by the dial 222 on the control panel 92. The operator, by adjusting the position of the dial 222, moves slider 357a to set the low limit voltage signal applied to the noninverting terminal 356. Nominally this input signal will range from 0 to +10 volts. The output 359 of amplifier 350 is connected through a diode 362 and feedback line 364 to its inverting terminal 366. A +15 volt source 368 is connected through a 10 kilohm variable resistor 370, a variable resistor 371, a 10 kilohm resistor 372, and the feedback line 364 to the inverting terminal 366. The position of slider 371a of the resistor 371 is set by control dial 224. The operator, by adjusting the position of the dial 224, moves the slider 371a to set the high limit voltage signal applied to the inverting terminal 366. Nominally this signal will range from 0 to +10 volts. The amplifiers 354 and 352 are coupled together through diodes 382 and 384 so that the amplifier which has the highest output signal dominates. The output signal is transmitted through point 379 to the set point 94 of the reflux flow controller module 62.

The function of this high/low limit circuit 199 is to test the signal from output 215 of multiplier 196 and determine if this output signal is within the high and low limits set by the positions of dials 222 and 224. For example, assume the operator has set the high and low limit dials 222 and 224 so that the input signal to terminal 356 of the amplifier 354 is +4 volts and the nominal input signal to terminal 366 of the amplifier 350 is +6 volts. If the signal from output 215 is +5 volts, it is within this range and will pass through the high/low limit circuit 199 and be transmitted to the set point input 94 of the reflux flow controller module 62.

Specifically, the +5 volt signal will be applied to the noninverting terminal 374 of the amplifier 350. Since the signal at the terminal 374 is +5 volts and the signal initially applied to the inverting terminal 366 is +6 volts, the signal at the output 359 of amplifier 350 will go negative and the diode 362 will pass this negative signal. The amplifier 350 will be turned on until the voltage at junction 376 is +5 volts. This +5 volt signal is applied to the inverting terminal 366 of amplifier 350 and the noninverting terminal 377 of the amplifier 352 through the feedback line 364. Amplifier 352 is turned on to apply through its feedback circuit to its noninverting terminal 378 a +5 volt signal. This positive going voltage passes through diode 384 and is also applied to terminal 380 of amplifier 354. Since the signals at the terminals 356 and 380 of amplifier 354 are not equal, amplifier 354 attempts to transmit a −1 volt signal to its inverting terminal 380 to equalize the signal at its terminals. However, the diode 382 will not pass this negative going signal. Consequently, the amplifier 354 is driven to saturation and only the +5 volt signal from amplifier 352 will be forwarded through the point 379 to the reflux controller module 62.

Assume the signal at output 215 of the multiplier 196 is a +1 volt signal. Such a +1 volt signal applied to terminal 374 of amplifier 350 will cause the output of this amplifier to go negative. The negative going signal will pass through diode 362 until the voltage at junction point 376 is +1 volts. This +1 volt signal will be applied to terminal 377 of amplifier 352. Nominally the voltage at terminal 378 of the amplifier 352 is +4 volts. Consequently, the amplifier 352 generates a negative going signal, but the diode 384 prevents this signal from being transmitted to the terminal 378. This drives the amplifier 352 to saturation. Thus the amplifier 354 dominates to apply the +4 volt signal to its inverting signal 380 and to the set point input 94 of the reflux controller module 62 through the point 379.

Assume the output signal at output 215 of the multiplier 196 is +7 volts. In this case, there will be a +1 volt difference in signals between the terminals 374 and 366 of amplifier 350. This would cause the output of the amplifier to go positive, but because of the diode 362 this positive going signal will not be transmitted through the diode. Consequently, this amplifier 350 is driven to saturation, and the +6 volt high select signal at junction 376 is applied to terminals 366 and 377 and through the amplifier 352 to the point 379. Thus the high limit of +6 volts is in force.

The light circuit 238 is a conventional circuit for turning the lights 226 and 228 on and off. It includes amplifiers 386 and 388 having their outputs connected through transistor 390 and 392 to the lights 226 and 228 which may be mounted to control panel 92 or the module 70. The inputs of these amplifiers 386 and 388 are connected to the outputs of amplifiers 354 and 244. This arrangement permits the light 226 to be turned on when the low limit is in force. Similarly, the light 228 is turned on when the high limit is in force.

If desired, the reflux flow can be set at a fixed rate. This is achieved by turning the dial 224 until the high limit signal is 0 volts, and turning the dial 222 until the low limit signal sets the desired reflux rate. Since the low limit signal at such setting will always dominate, the signal to the set point 94 of module 62 will always equal this low limit signal.

Pressure Controller System

To achieve separation of distillate and bottoms meeting product specifications, tower pressure must be kept constant. Heat flow into the tower 12 controls this pressure, and it is regulated by the pressure controller system 108 of our invention illustrated in FIG. 6. Feed flow and composition into the tower 12, which is uncontrolled, determines distillate flow. The flow transmitter 50 monitors the rate of distillate flow, generating a signal proportional to the square of the feed flow rate. The pressure transmitter 44 monitors the tower pressure, generating a signal porportional to this pressure. Thus, any incipient changes in pressure are detected. The flow transmitter 52 in the heat line 22 monitors the heat flow rate, and generates a signal proportional to the square of the heat flow rate. If feed flow or composition changes, causing a change in distillate flow, more or less heat will be needed to maintain the desired tower pressure. This change in distillate flow causes the valve 35 in the heat line 22 to open or close depending on the distillate flow rate. Pressure is used to check the integrity of our pressure controller system 108. In other words, if the valve 35 is opened to permit more steam to flow into the tower 12 to heat the feed, but the pressure at the top of the tower begins to deviate from the desired pressure, a correction will be made in our system 108 to open the valve 35 further, permitting more steam to flow into the tower until the desired pressure is reached.

Our novel pressure controller system 108 has an automatic and manual mode of operation and it includes an automatic-manual station 394, the pressure controller module 72, which is a secondary controller, and the heat flow controller module 68 which is a primary controller. The module 72 includes a multiplier 396 and a comparator 398, also key components of the system 108. In the automatic mode, the heat flow controller module 68 opens and closes the steam valve 35 in response to the distillate flow rate signal transmitted to the set point input 97 of this module 68 by the multiplier 396. The pressure signal is transmitted to the multiplier 396 to correct the multiplier's output signal if the tower pressure is not at the desired level. A correction in valve position is then made as required to bring the tower pressure to the desired level. In the manual mode, valve position is controlled by a manually initiated signal. The distillate flow rate signal is followed or tracked during the manual mode by the comparator 398, and the comparator modifies the output signal from the multiplier 396 so that on switching back to the automatic mode the valve position remains the same. This avoids any rapid and abrupt opening or closing of the valve 35, and thus a "bumpless and balanceless" transfer from manual to automatic is achieved.

The automatic-manual station 394 determines whether our system 108 is in manual or automatic mode of operation, and it includes a manually operated switch 400 which controls the operation of a control relay 402. This relay has three contacts 403, 404 and 405 which are closed when the switch 400 is in the position A for automatic mode of operation. In this automatic mode, the control signal from the heat flow controller module 68 is regulated by the distillate flow rate signal and pressure signal. When the switch is moved to the position M for manual mode of operation, the control relay 402 is energized, opening its three contacts 403 through 405. In particular, the contact 405 in the module 68 now connects this module's amplifier 406 to either a +15 or −15 volt DC power source through either of the parallel connected push button switches 408 and 410. The operator now depresses one of these switches to connect the amplifier 406 to a power source. Depending upon whether the voltage input to amplifier 406 is negative or positive, the module 68 generates a control signal which opens or closes the valve 35. Switch 400 and push button switches 408 and 410 are mounted on control panel 92, FIG. 2.

The heat flow controller module 68 includes a summer 444 and the amplifier 406. This amplitude 406 has an input circuit and feedback circuit (not shown) similar to the secondary controller 72. This module 68 includes the relay contact 405 between the output 445 of the summer 444 and the inverting terminal 446 of the amplifier 406. The summer 444 has two inputs 448 and 450, one connected to the output 452 of the multiplier 396, the other connected to the flow transmitter 52 in the heat line 22 through a square root extractor 441 and current to voltage converter 443. In the automatic mode, the output 445 of the summer 444 is connected to the inverting terminal 446 of the amplifier 406. If the signals at the summer's inputs 448 and 450 are not equal it will generate a differential signal changing the output signal of the amplifier 406 until the signals at the inputs 448 and 450 are again equal. The output signal from the amplifier 406 is transmitted through a voltage to current converter 454 to the transducer 39 which opens and closes the valve 35 in the heat line 22. A valve meter 153c having its scale 147c displayed on the control panel 92 indicates the position of the valve 35.

The pressure control module 72, in addition to the comparator 398 and multiplier 396, includes a summer 412 and an amplifier 414. The relay contacts 403 and 404 are on opposite sides of the amplifier 414. One input 416 of the summer 412 is connected through a current to voltage converter 418 to the pressure transmitter 44. The other input 420 of the summer 412 is a manually adjusted voltage signal. A dial 422 on control panel 92 sets the voltage signal at input 420 through a variable resistor (not shown). The output 424 of the summer 412 is connected to the inverting terminal 426 of the amplifier 414 through an input circuit 428 including a parallel connected variable resistor 430 and capacitor 432, and the normally closed relay contact 403. The amplifier output 434 is connected to one input 436 of the multiplier 396, and is also connected to its inverting terminal 426 through a feedback circuit 438. This feedback circuit 438 includes the normally closed relay contact 404, a series connected variable resistor 440 and a capacitor 442, and the normally closed relay contact 403 in the input circuit 428.

In the automatic mode, the summer 412 receives at input 416 a voltage signal from the current to voltage converter 418 which is proportional to the tower pressure. The summer 418 compares this voltage signal to the voltage signal at its other input 420. If these signals are equal, the signal at the summer output 424 is zero. Thus, there is no current flow across the resistor 430 to the inverting amplifier terminal 426. As long as there is no signal received at this terminal 426, the signal at the amplifier output 434 remains constant. If summer input signals are unequal, the summer 412 generates an output signal. This output signal from the summer 412 causes the output signal of the amplifier 414 to either increase or decrease in proportion to the signal from the summer. More specifically, the summer output signal charges the capacitor 432 and establishes a voltage differential across the resistor 430, causing current to flow across this resistor. The capacitor 432 continues to charge and current continues to flow until the summer 416 ceases generating an output signal, i.e. until the signals at its inputs 416 and 420 are equal. The rate of current flow is controlled by the resistance of the resistor 430. This resistance may be varied manually over a predetermined range and is conventionally referred to as the reset rate. The output signal of the amplifier 414 is opposite in polarity to the signal at the inverting terminal 426. This amplifier output signal is transmitted through the feedback circuit 438 to charge the capacitor 442. The instantaneous output signal for a given input signal is controlled by the resistance of the resistor 440. This resistance is manually variable over a predetermined range conventionally referred to as the "proportional band." The capacitor 442 will continue to charge as long as a signal is received at the inverting amplifier terminal 426. When the summer 412 ceases generating an output signal, indicating tower pressure is at the desired level, the voltage across the compacitor 442 is applied as a signal to the inverting amplifier terminal, holding the amplifier output signal at a constant voltage until the summer 412 again generates another signal initiating corrective action.

The multiplier 396 has two inputs 436 and 456 and the output 452. In the automatic mode, the one multiplier input 436 is connected to the output 434 from the amplifier 414. In the manual mode, this input 436 is connected to the comparator output 458 through the relay contact 404. The other multiplier input 456 is connected through a square root extractor 151 and current to toltage converter 155 in the distillate flow controller module 64 to the distillate flow rate transmitter 50. The output 452 from the multiplier 396 is connected to the input 464 of the comparator 398 and to one of the summer inputs 448 of the heat flow controller module 68.

In the automatic mode, the output signal from this multiplier 396 is a function of the distillate flow rate and the tower pressure, and this multiplier output signal controls through the heat flow controller module 68 the position of the valve 35. As distillate flow increases, the multiplier output signal increases proportionately. This causes the control signal from output 69 to increase in amplitude and open the valve 35. As the distillate flow decreases, the multiplier output signal decreases proportionately. This causes the control signal from output 69 to decrease in amplitude and close the valve 35. The signal from the pressure transmitter 44 via current to voltage converter 418 to input 416 of summer 412 equals the manually adjusted summer voltage signal at input 420 so long as tower pressure is at the desired level. If a difference in input signals exists, the output signal of the amplifier 414 changes and is applied to the multiplier input 436. This changes the multiplier output signal, which in turn changes the control signal at the output 69 of the heat flow controller module 68 to open or close the valve 35 until tower pressure is restored to the desired pressure.

One novel feature of our pressure controller system 108 is the use of the comparator 398 to track the output signal from the multiplier 396 during the manual mode of operation. This comparator 398 has one input 464 connected to the multiplier output 452, and its other input 466 connected to the flow transmitter 52 in the heat line through the square root extractor 441 and current to voltage converter 443 in module 68. In the manual mode, the output 458 of the comparator 398 is connected through the relay contact 404 to the input 436 of the multiplier 396 and the feedback circuit 438 of the amplifier 414. In the manual mode, the output signal of the comparator 398 is constant so long as its input signals are equal. If the signal from the flow transmitter 52 is different from the output signal of the multiplier 396, the comparator output signal will either decrease or increase to alter the input signal to the one input 436 of the multiplier 396. This increasing or decreasing signal from comparator 398 will continue until the multiplier output signal equals the signal from the flow transmitter 52. This output signal from the comparator 398 is also transmitted through the resistor 440 in the feedback circuit 438 to charge the capacitor 442. In the manual mode, the relay contact 403 on the input side of the amplifier 414 is open to ground one side of the feedback and input circuits 428 and 438. In accordance with our invention, when the system 108 is returned to automatic control, the voltage across the feedback capacitor 442 will be applied to the inverting terminal 426 of the amplifier 414. Thus, the amplifier's output signal will equal the comparator's signal previously being applied to the one input 436 of the multiplier 396. In other words, switching from manual to automatic does not change the output signal from the multiplier 396. Note, during manual mode, if the distillate flow rate signal changes, tending to change the multiplier's output signal, the comparator 398 adjusts the signal at the multiplier input 436 so that the multiplier output signal will equal the heat flow rate signal. This may cause the tower pressure to divert from the desired level. However, when our control system 108 is switched to automatic, corrective action will not be immediately initiated by the module 72, but will be delayed because the capacitor 442 in the feedback circuit 438 was precharged during the manual mode of operation. In other words, the signal from amplifier 414 will initially equal the comparator output signal immediately preceding switching from manual to automatic mode. Gradually, as determined by the resistance value of the resistor 430 in the input circuit 428, the output signal of the amplifier 414 will change as required to correct to the desired tower pressure. This avoids abrupt changes which could upset tower operations.

Associated with each of the modules 72 and 68 are, respectively, flow meters 451 and 453. The meters 451 and 453 have their respective scales 451a and 453a displayed on the control panel 92 (FIG. 2). The pointers of the meter 451 indicate the value of the square root extractor signal from the steam flow transmitter 52 and the voltage pressure signal from pressure transmitter 44. The meter 453 permits the operator to compare the measured heat flow rate with the desired or set point heat flow rate. When the upper and lower pointers of this meter 453 are aligned, the actual and desired heat flow rate are the same.

Override System

Prior Art

To better understand the novel features of our override system 110, we shall briefly discuss a typical feed forward system 470 for controlling the flow of effluent from a container or tank 473. Liquid flows in an uncontrolled manner through the influent line 474 into the top of the tank 473, and a flow transmitter 475 monitors this liquid flow. Liquid is simultaneously withdrawn from the bottom of the tank 473 through an effluent line 476 including a valve 477, which is opened or closed in response to a control signal from a conventional flow controller 478. A flow transmitter 479 in the effluent line 476 monitors effluent flow rate and transmits a flow rate signal to the measure input of the flow controller 478. A level transmitter 480 monitors liquid level in the tank 473 and transmits a level signal to the measure input of a conventional level controller 481. A voltage signal is applied to the set point input of the level controller 481 throuogh a variable resistor whose resistance level is controlled by the position of a dial 482. As level deviates from the midpoint of the level transmitter 480, the output signal from the level controller 481 varies. This output signal from the level controller 481 and the signal from the flow transmitter 475 are inputs to a multiplier 483. The output signal of this multiplier 483 is transmitted to the set point input 484 of the flow controller 478.

Common to most processes using this conventional system 470 is the problem that liquid level will fluctuate radically and excessive noise will occur because of liquid sloshing around in the tank 473. This causes the valve 477 to be opened and closed frequently in response to even slight level fluctuations. Thus the effluent flow will fluctuate excessively, causing problems in downstream operations that require minimal effluent flow fluctuation. Attempts have been made to resolve this problem by using level controllers having a non-linear output signal to compensate for liquid level fluctuations.

Such prior art systems have been used in the past in controlling the material balance of a fractionation tower, As is well known, conventional feed forward control systems for fractionation towers require such a prior art system for controlling material balance, otherwise the tower will eventually go dry or flood because the signals from the various transmitters are imprecise. Consequently, either too much or too little material is removed from the tower as feed flow rate fluctuates. These prior art systems will, however, cause unnecessary deviations in bottoms flow due solely to minor fluctuations in liquid level.

General

We have now invented a feed forward flow control system which is responsive to changes in liquid level provided these changes are significant. In our system 110, bottoms or effluent flow rate is unaffected by undulations in liquid at the surface. Also, in our system 110, the level is not held precisely, but permitted to vary, absorbing minor system fluctuations, and holding effluent flow steady so that only significant changes in influent flow rate or feed composition causes variations in effluent flow rate. Only when predetermined level limits are in danger of being exceeded will our system 110 change effluent or bottoms flow rate as a function of liquid level. The relationship between the control signal to the set point input 96 of the bottoms flow controller module 66 and the liquid level signal is used to determine if the level limits are in danger of being exceeded.

Figure 8:
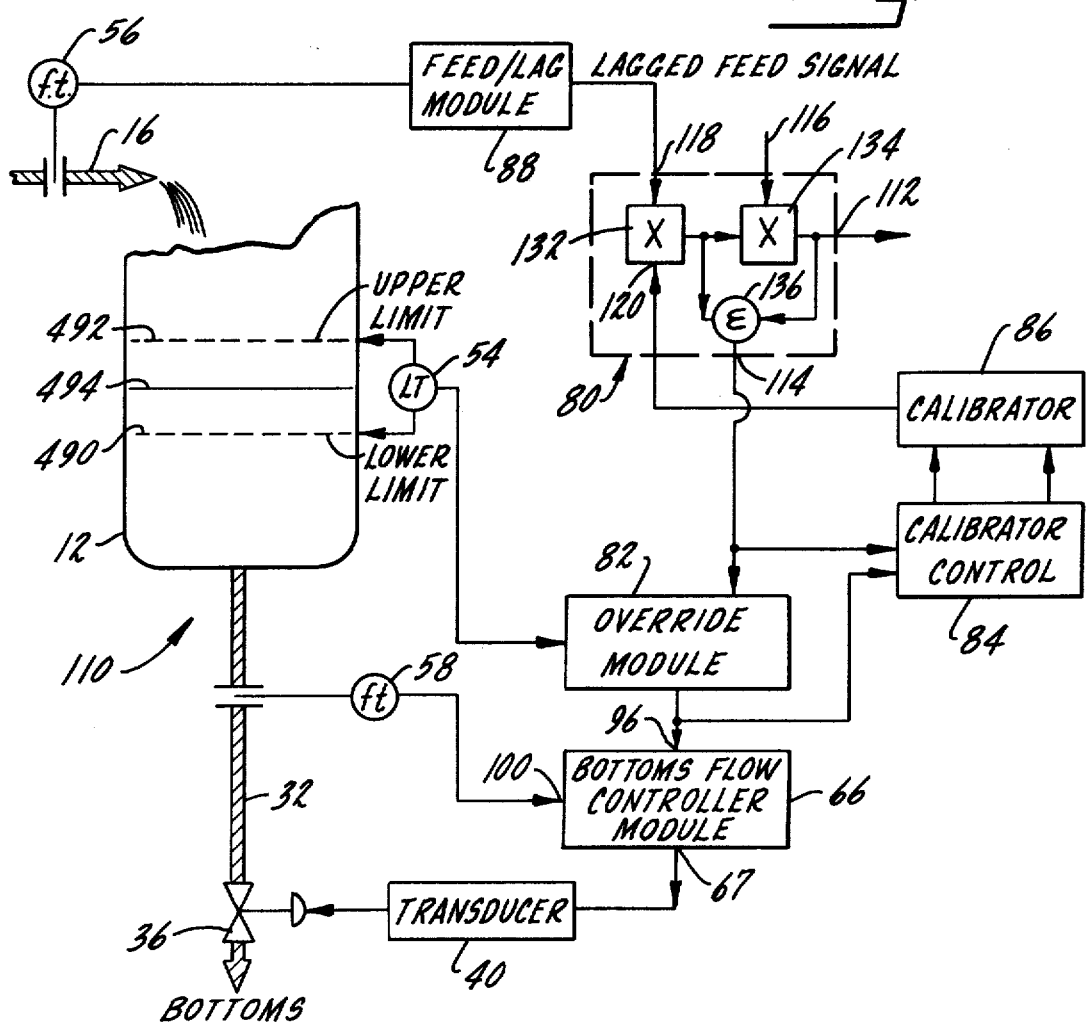
FIG. 8 is a schematic drawing of our override system.

As shown in FIGS. 8 and 12, our override system 110 includes: the flow transmitter 56 in feed line 16, the flow transmitter 58 in the bottoms line 32, the level transmitter 54, the multiplier 132 in the divider module 80, the override module 82, the bottoms flow controller module 66, the calibrator controller module 84, and the calibrator module 86. Feed flows in an uncontrolled manner through the feed line 16 into the tower 12, and the flow transmitter 56 monitors the feed flow rate. Bottoms are simultaneously withdrawn from the bottom of the tower 12 through the bottoms line 32 including the valve 36 which is opened or closed in response to the control signal from the output 67 of the bottoms flow controller module 66. The bottoms flow transmitter 58 monitors the flow rate of bottoms in the line 32, and provides a signal proportional to the square of the flow rate. The level transmitter 54 monitors liquid level as it moves within upper and lower limits and provides a signal proportional to liquid level. For example, when the liquid level is at the bottom limit shown as dotted line 490, the signal from the level transmitter 54 is zero. When the liquid level is at the top limit shown as dotted line 492, the signal from the level transmitter 54 is 100 percent of its maximum output capacity. When the liquid level is precisely midway between the upper and lower limits as shown by solid line 494, the output of the level transmitter 54 operates at its midpoint or 50 percent of maximum output capacity.

As rate of feed flow into the tower 12 increases or decreases, the transmitter 56 transmits the feed flow rate signal proportional to this feed flow rate. As mentioned above, feed flow rate signal and the signal at input 116 of divider module 80 controls the signal at the set point input 96 of the bottoms flow controller module 66. If the rate at which feed flows into the tower 12 minus the rate at which distillate is removed from the tower equals the rate at which bottoms flows from the tower, the liquid level will remain constant somewhere between the high and low limits. The flow transmitter 58 monitors bottoms flow. The bottoms flow rate signal from the transmitter 58 is transmitted to the bottoms flow controller module measure input 100. So long as the signals at the measure and set point inputs 100 and 96, respectively, are equal, indicating that the bottoms flow rate is correct, the control signal from the output 67 remains constant, holding the valve 36 at whatever position it may be. If there is a difference in signals at the inputs 100 and 96, there is generated at the output 67 an integrated signal proportional to this difference. If the signal at the set point input 96 is greater than the signal at the measure input 100, the valve 36 will be opened. If the signal at the set point 96 input is less than the signal at the measure input 100, the valve 36 will be closed. When the maximum rate of flow of feed into the tower 12 occurs, the valve 36 will be fully opened. If no feed is flowing into the tower 12, the valve 36 will be fully closed.

Figure 10:
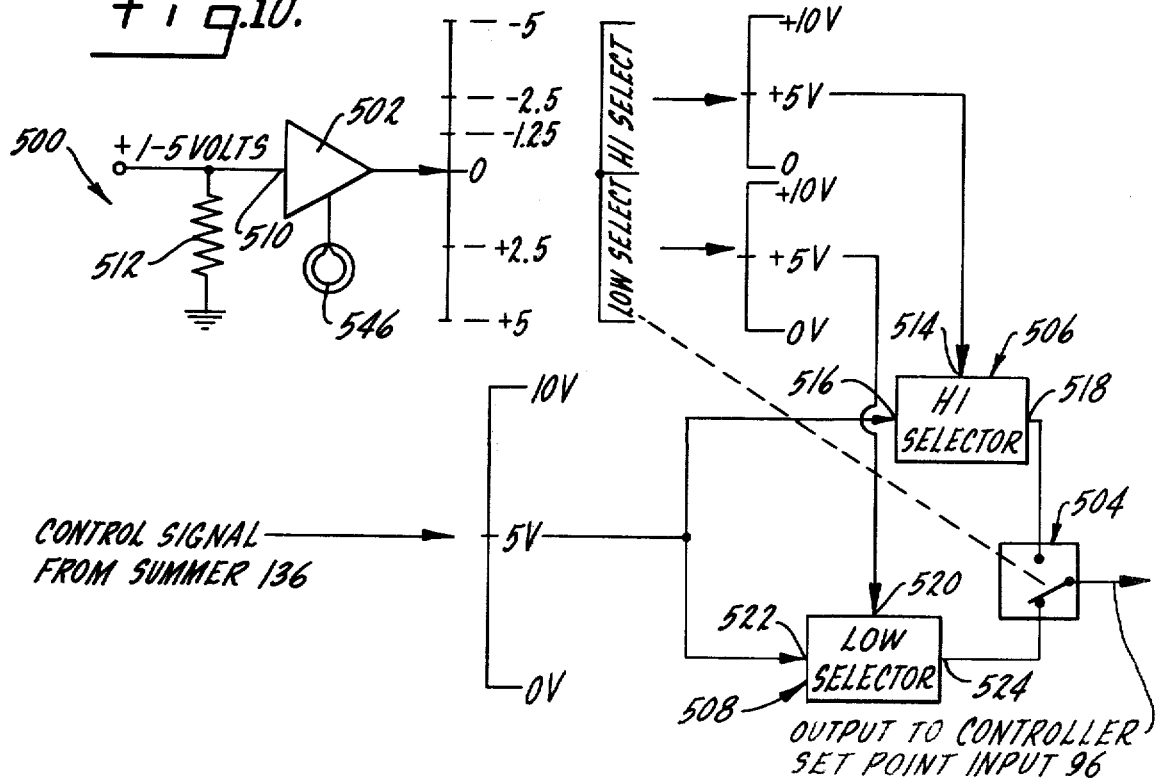
FIG. 10 is a schematic drawing of the override circuit employed by our override system.

The novel feature of our override system 110 is that a control signal proportional to the feed flow rate and feed composition is transmitted to the set point input 96 of the bottoms flow controller module 66, provided the relationship between this control signal and liquid level signal meets certain criteria. In our system 110 even though liquid level fluctuates between certain limits, such fluctuations in liquid level will not terminate the transmission of the control signal to the set point input 96 of the module 66, provided the level limits are not in danger of being exceeded. As schematically illustrated in FIG. 8, the bottoms flow set point signal from the summer 136 serves as the control signal. It is transmitted to the set point input 96 through the override module 82, including our novel override circuit 500 (FIGS. 10 and 11). In accordance with our invention, the override circuit 500 has an operable or override state, and a nonoperable or nonoverride state, depending on the relationship between the liquid level signal and the control signal. This circuit 500 is in the nonoverride state when this signal relationship is correct indicating that the level limits are not in danger of being exceeded and in the override state when the signal relationship is incorrect indicating the limits are in danger of being exceeded.

Figure 9:
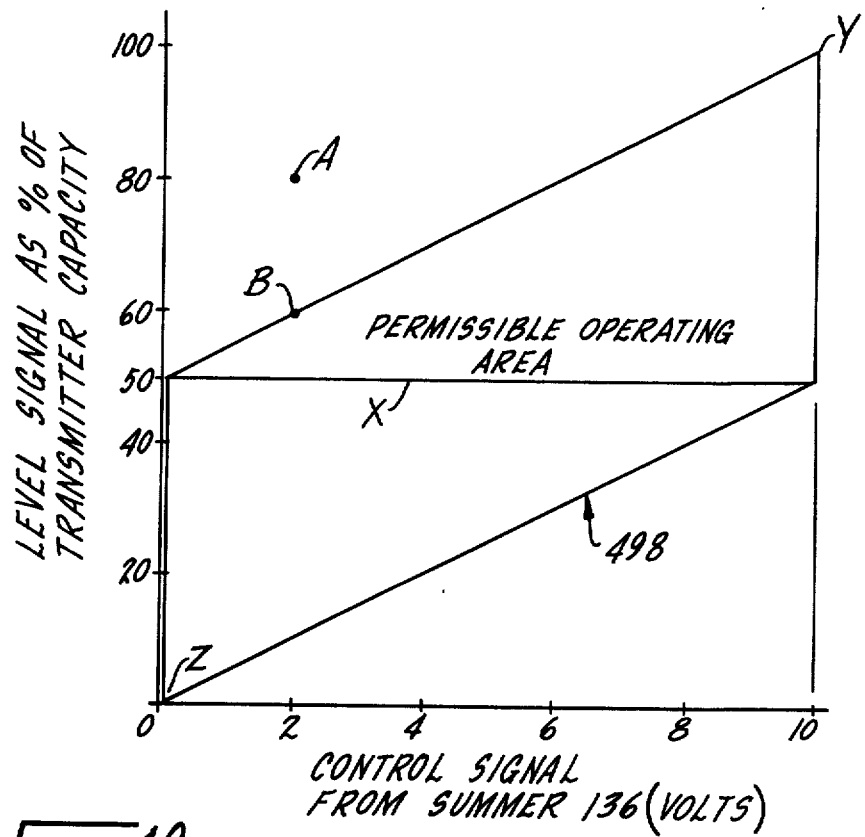
FIG. 9 is a graph illustrating the correct and incorrect relationship between the control signal and the liquid level signal.

This feature is best illustrated by the graph shown in FIG. 9. Along the ordinate of this graph is plotted the level signal as a percent of its transmitter 54 output capacity. Along the abscissa of this graph is plotted the control signal which we shall assume for purposes of illustration ranges between 0 and 10 volts. The area inscribed by the parallelogram 498 defines the correct relationship between the level and control signals. The area outside this parallelogram 498 defines an incorrect relationship between these signals. As long as the values corresponding to the level signal and control signal are within the parallelogram 498, the override circuit 500 will be in the nonoverride state. To illustrate, assuming the liquid level is at the line 494, the midpoint between the upper and lower limits. This would be equal to the level transmitter 54 operating at 50 percent of its maximum capacity. Follow line X in FIG. 9 and note that the control signal could be any voltage between 0 and 10 volts and the override circuit 500 would remain in the nonoverride state. In this condition, the control signal from the divider module 80 would be transmitted by the override circuit 500 to the set point input 96. Now assume that the signal from the level transmitter 54 was at 100 percent of its capacity, indicating that the liquid level was at line 492, the upper limit. If the control signal was at its maximum 10 volts, point Y, there would still exist the correct relationship between signals and no corrective action would be taken by the override circuit 500. Similarly, if the output signal of the level transmitter 54 was zero and the control signal was 0 volts, point Z, a correct relationship would prevail. With the signal from the transmitter 54 at zero, the liquid level would be at line 490. In this case the valve 36 would be fully closed to prevent any flow of liquid from the tower 12. If, for example, the level transmitter 54 was operating at its 80 percent of its maximum capacity, but the signal from the control signal was 2 volts, point A, this relationship between signals would be incorrect. Point A, being outside the parallelogram 498, thus defines an incorrect signal relationship and the override circuit 500 would switch to the override state. The signal from the level transmitter 54 would then be directed through the override circuit 500 to the set point input 96 of bottoms flow controller module 66 where it would command a 60 percent bottoms flow. The circuit 500 would remain in this override state until the liquid level receded to a level where the level transmitter 54 would transmit a signal equal to 60 percent of its maximum output, point B. This would be the correct relationship between level signal and feed flow signal, and the override circuit 500 would be switched back to a nonoverride state.

In accordance with our invention, the nonoverriding band of the override circuit 500 shifts to accommodate maximum fluctuations in liquid level with minimum overriding of the feed flow rate signal from the feed transmitter 56. Note that circuit 500 will be in the nonoverride state with the level transmitter 54 operating at 20 percent capacity and the control signal at from 0 to 4 volts. The circuit 500 will still be in the nonoverride state with the level transmitter 54 operating at 80 percent capacity and the control signal at 6 to 10 volts. In other words, the nonoverride band has shifted with a change in level. Once the circuit 500 goes to the override state the calibrator control module 84 is activated which in turn activates the calibrator module 86. Note the calibration control module 84 receives the input signal to the override module and the output signal from this module. Whenever these input and output signals are unequal, the override circuit 500 is in the override state and the calibrator control module 84 is activated. Under these conditions the calibrator module 86 transmits to the multiplier 132 at input 120 a signal which recalibrates the multiplier 132. Such recalibration is required otherwise the override circuit 500 would, under normal conditions eventually go into the override state and remain in this state. This would defeat the purpose of our override system, since the signal from the level transmitter 54 would control bottoms flow. In our override system 110, material balance is achieved with minimal override of the control signal from output 116 of the divider module 80. When override is necessary, there is automatic recalibration of the control signal so that tower operations are readjusted to return the override system 110 to the nonoverride state. This will be explained fully below.

Override Circuit

The override circuit 500 is contained in the override module 82, and FIG. 10 illustrates the logic of this circuit. The chief components of this circuit 500 are a level signal amplifier 502, an electronic switch 504, and a high selector 506 and a low selector 508. Assuming that the level signal will range between 4 and 20 milliamps, then at 4 milliamps liquid level will be at the lower limit, at 20 milliamps liquid level will be at the upper limit. This current signal is transmitted to the inverting terminal 510 of the level signal amplifier 502 through a grounded 249 ohm load resistor 512 to apply at the terminal 510 a voltage signal ranging between +1 and +5 volts, depending where the liquid level is in the tower 12. When the liquid level is at the midpoint between the high and low limit, the input signal to the amplifier 502 will be +3 volts and the output from this amplifier will be 0 volts. If liquid level is at the upper limit, the amplifier input signal will be +5 and the amplifier output signal will be a −5 volts. If the liquid level is at the lower limit, the amplifier input signal wil be +1 volt and the amplifier output signal will be +5 volts. This current signal is also transmitted through a current to voltage converter 556 to a bottoms level meter 558 (FIG. 2 and 11). The scale 558a of the meter 558 is displayed on the control panel (FIG. 2).

The override circuit 500 has a high and low select mode of operation depending on the output signal from the amplifier 502. The zero to −5 volt range is the high select mode of operation and the 0 to +5 volt range is in the low select mode of operation. In the high select mode, the electronic switch 504 is switched to enable the high selector 506. Conversely, in the low select mode, it is switched to enable the low selector 508.

The high selector 506 has two inputs 514 and 516 and an output 518. Output 518 is connected to the set point 96 of module 66 through the switch 504. The low selector 508 has two inputs 520 and 522 and output 524. Output 524 is connected to the set point input 96 of module 66 by the switch 504. Inputs 516 and 522 receive the control signal from the divider module 80. Inputs 514 and 520 receive the level signal transmitted by the amplifier 502. The low selector 508 will select whichever is the lowest signal at its inputs 520 and 522 and transmit this lowest signal through the switch 504 to set point 96 if the circuit 500 is in the low select mode. The high selector 506 will select whichever is the highest signal at its inputs 514 and 516 and transmit this highest signal through the switch 504 to set point 96 if circuit 500 is in the high select mode.

More specifically, assume the control signal transmitted to the override circuit 500 from the divider module 80 has a range of from 0 to 10 volts depending on the actual feed flow rate and feed composition. 0 volts calls for zero bottoms flow from the tower 12. Ten volts calls for maximum bottoms flow from the tower 12. Any voltage less than maximum results in a signal having a proportional value between these minimum and maximum values. This control signal is forwarded to the high and low selectors 506 and 508 and applied at inputs 516 and 522. In the high select mode, the override circuit 500 applies to the input 514 of the high selector 506 a 0 to +10 volt signal. In the low select mode, the override circuit 500 applies to the input 520 of the low selector 524 a 0 to +10 volt.

Assume the output of the level signal amplifier is a −2.5 volts. This is the high select range where the electronic switch 504 switches the override circuit 500 to the high select mode of operation. In this high select mode, the −2.5 volt signal is converted by the override circuit 500 to a +5 volt signal and compared with the control signal. Note, this −2.5 level signal is equivalent to the level transmitter 54 operating at 75 percent of its maximum output capacity. Thus, referring to the FIG. 9, the control signal must be at about 5 volts, otherwise the relationship between signals is incorrect. The high selector 506 will transmit the higher voltage through the switch 504. If the control signal is +2.5 volts, the circuit 500 will go to the override state. The high selector 508 will compare this +2.5 volt control signal at input 516 with the +5 volt level signal applied to its other input 514 and transmit the higher +5 volt signal to the set point 96 module 66.

Now assume the output signal from the level signal amplifier 502 is +2.5 volts. This +2.5 volt signal switches the override circuit 500 to the low select mode of operation, and the circuit 500 amplifies the +2.5 volt signal to a +5 volt signal which is applied to the input 520 of the low selector 508. Note the +2.5 volt level signal is equivalent to the level transmitter operating at 25 percent of its maximum output capacity. Thus, referring to FIG. 9, the control signal should be 5 volts. This control signal is applied to the low select comparator 508 at input 522. As long as this control signal is 5 volts or lower, it will be transmitted through the switch 504 to the set point 96. Thus, the override circuit 500 would be in the nonoverride state. If the control signal is +7.5 volts, the valve 36 would open more. The circuit 500, however, under these conditions is in the override state, and the low selector 508 prevents this +7.5 volt signal from being transmitted to the set point 96 and instead applied to the +5 volt level signal to the set point input 96. The level signal is transmitted to set point input 96 so long as the circuit 500 is in the override state.

FIG. 11 illustrates the details of the override circuit 500. The chief components of this circuit 500 are the amplifier 502, the electronic switch 504, the low selector 508 and the high selector 506.

The amplifier 502 has its output 530 connected through line 531 to the switch 504 and through line 533 to the high select amplifier 506. The amplifier output 530 is also connected through a feedback circuit 532 to the inverting terminal 510 of the amplifier 502. This feedback circuit 532 includes a 5 kilohm variable resistor 534 and a 249 kilohm resistor 536, and a 0.22 farad capacitor 538 in parallel connection with the resistors 534 and 536. A 49.9 kilohm resistor 540 and a 100 kilohm variable resistor 542 connect resistor 512 to the inverting terminal 510 of amplifier 502. The ratio of the resistance values for the resistors 540 and 542 and the resistors 536 and 534 in the feedback circuit determine the gain of the amplifier 502. A slider 544 is manually adjusted by a dial 546 (FIG. 10) to set the amplifier gain. To use the full scale of the level transmitter 54, i.e., from maximum to minimum transmitter capacity, the resistance valves are set so that the gain of the amplifier 502 is 2.5. A negative bias from a −15 volt source 548 is applied to terminal 510 through a 10 kilohm variable resistor 550 and 200 kilohm resistor 552. Consequently, the 1 volt signal at junction 554—the equivalent of the 4 milliamp current signal from the level transmitter 54—is transmitted to the inverting terminal 510 along with a negative bias voltage so that the output signal amplifier 502 is a +5 volts. When the signal at junction 554 is +5 volts—the equivalent of the level transmitter 54 providing a 20 milliamp output, the ouput signal from amplifier 502 will be a −5 volts. When the signal from the level transmitter 54 is 12 milliamps (midscale of the transmitter 54), the signal at junction 554 is +3volts and the output from amplifier 502 is 0 volts.

The gain of the amplifier 502 is varied depending upon the parameters of the tower 12 and the scale of the level transmitter 54. For example, assume the tower 12 is 50 feet high and the full range or scale change of the transmitter 54 corresponds to a change in liquid level is 20 feet. That is, the liquid level could vary 20 feet between its high and low limits for the transmitter 54 output signal to go from zero to maximum capacity. For a tower 50 feet high such a 20 foot level change would ordinarily be too great. By adjusting the dial 546 so that the slider 544 is midway on resistor 534, the gain of the amplifier 502 is doubled from 2.5 to 5.0. Consequently, a change in liquid level of only 10 feet or one half the transmitter's scale will cause a full scale change in the output signal from amplifier 502 from +5 to −5 volts. It should be noted that when liquid level is at the midpoint of the level transmitter scale, the output signal from amplifier 502 will be zero regardless of the position of slider 544.

The electronic switch includes a low select comparator 560, a high select comparator 562, and two transistors 564 and 566. The noninverting terminal 568 of low select comparator 560 is connected through a 100 kilohm resistor 570 and line 531 to the output 530 of the level signal amplifier 502. The inverting terminal 572 of high select comparator 562 is also connected through a 100 kilohm resistor 574 and line 531 to the output 530 of amplifier 502. The inverting terminal 576 of comparator 560 and the noninverting terminal 578 of comparator 562 are connected to ground through 100 kilohm resistors 580 and 582.

The low select comparator 560 switches the override circuit 500 to the low select mode of operation when the output signal of the level signal amplifier 502 is in the 0 to +5 range. The high select comparator 562 switches the override circuit 500 to the high select mode of operation when the output signal of amplifier 502 is in the 0 to −5 range. The output 588 of the low select comparator 560 is connected through a 4.7 kilohm resistor 592 to the base 594 of the transistor 566, and the output 590 of the high select comparator 562 is connected through a 4.7 kilohm resistor 596 to the base 598 of the transistor 564. These outputs 558 and 590 are also connected to light circuits 600 and 602, respectively, for turning on lights 604 and 606. The light 604 is on when the override circuit 500 is in the high select mode of operation, and the light 606 is on when the circuit 500 is in the low select mode of operation. These lights may be located on the module 82 and/or on the control panel 92 (FIG. 2).

The transistor 564 grounds the output 524 of the low select comparator 560 when the override circuit 500 is in the high select mode, and the transistor 566 grounds the output 518 of the high select comparator 506 when the circuit is in the low select mode. This is achieved by coupling the emitters 608 and 610, respectively, of transistors 564 and 566 to ground. The collector 615 of transistor 564 is connected to a +15 volt source 612 through a 2.2 kilohm resistor 614. The +15 volt source 612 is also connected through line 618, output 524, diode 620 and lines 621 and 622 to the set point input 96 of the bottoms controller module 66. The collector 617 of transistor 566 is also connected to the set point input 96 of module 66 through line 624, output 518, diode 626 and line 622. The high and low select comparators 560 and 562 determine which of the transistors 564 and 566 will be turned on. If transistor 564 is on, the circuit 500 is in the low select mode and the low select comparator 560 will transmit to set point input 96 the lower of the signals received at its inputs 520 and 522. If the high select transistor 566 is on, the circuit 500 is in the high select mode and the high select comparator 562 will transmit to set point input 96 the higher of the signals received at its inputs 514 and 516. If the liquid level is exactly at line 494 (FIG. 8), the output from the amplifier 502 will be zero. As a result, the comparators 560 and 562 will be arbitrarily switch back and forth turning either transistor 564 and 566 on and off. Thus, either the high or low selector 506 and 508 may be operable. This is acceptable because in no event will the circuit 500 be in the override state and either the high or low selector 506 or 508 may transmit the control signal to the input 96 of the bottoms flow controller module 66.

The high selector 506 includes two amplifiers 670 and 672 having their respective outputs 670a and 672a connected together at output 518 through the diodes 674 and 676. The output 670a of amplifier 670 is connectd through a feedback circuit 687 to the amplifier's inverting terminal 686. The feedback circuit 687 includes the diode 674, the diode 626, and a 200 kilohm resistor 692. The inverting terminal 686 is connected to the output 530 of amplifier 502 through a 90.9 kilohm resistor 688 and a 20 kilohm variable resistor 690. The resistance values of the resistors 688, 690 and 692 are such that the amplifier 670 has a gain of two.

The output of amplifier 672 is connected through a feedback circuit 685 to its inverting terminal 678 through a feedback circuit 685 including the diode 676, the diode 626, a 90.9 kilohm resistor 680 and a 20 kilohm variable resistor 682. In series connection with resistors 680 and 682 is a 100 kilohm resistor 684. This forms a voltage divider circuit 671 which divides the signal to terminal 678 by a factor of two. The noninverting terminal of the amplifier 672 or input 516 is connected through a voltage divider 633 to the output of the summer 136 in the divider module 80. The voltage divider 633 includes a pair of 100 kilohm resistors 638 and 637 with the takeoff of the divider network between these resistors. Thus, the divider 633 divides the signal to input 516 by a factor of two. The resistance values of resistor 638 and resistors 680 and 682 are such that the amplifier 672 has a gain of one.

The low selector 508 also includes two amplifiers 628 and 630 having their respective outputs 628a and 630a connected together to the output 524 by diodes 634 and 636. The output 628a of amplifier 628 is connected to the inverting terminal 662 of this amplifier through a feedback circuit 663 including the diode 634, the diode 620, and a 200 kilohm resistor 654. There is a negative bias applied to the terminal 662 from the −15 volt source 660. This source 660 is connected to the terminal 662 through 20 kilohm variable resistor 658 and a 200 kilohm resistor 656. The output 530 of the amplifier 502 is also connected to the inverting terminal 662 through an input circuit including a 90.9 kilohm resistor 664 and 20 kilohm resistor 666. The resistance values of resistors 654 and resistor 664 and 666 are such that the amplifier 662 has a gain of two.

The output 630a of amplifier 630 is connected to the inverting terminal 640 of this amplifier 630 through a feedback circuit 641 including the diode 636, the diode 620, line 652, a 90.9 kilohm resistor 646 and a variable 20 kilohm resistor 648. The resistors 646 and 648 are in series connection with a 100 kilohm resistor 650, and form a voltage divider 642 which divides the signal to the terminal 640 by a factor of two. A −15 volt DC source 643 is connected to the terminal 640 through a 100 kilohm resistor 639 and the voltage divider 642. The noninverting terminal of the amplifier 630 or input 522 is connected through the voltage divider 633 to the output 114 of the summer 136 in the divider module 80.

As conventional, the amplifiers 670 and 672 in the high selector 506 and the amplifier 630 in the low selector 508, and the amplifiers 560 and 562 all include offset adjustments including a 10 kilohm variable resistor 693 connected to a −15 volt source. Sliders of these resistors 693 are adjusted so that when voltage signals are equal at both the inverting and noninverting terminals of these amplifiers, the output signal for these amplifiers will be zero.

In operation, assume the liquid level in the tower 12 is at line 492, the upper limit. The level transmitter 54 will be at maximum output or 20 milliamps and provided the amplifier 502 is set for a gain of 2.5, the output signal of this amplifier 502 will be −5 volts. This −5 volts signal, placing the override circuit 500 in the high select mode, is transmitted to the inverting terminal 572 of the high select comparator 562. As a consequence, the output signal from this comparator 562 goes positive. This positive signal turns on the transistor 564 so that the output 524 and the outputs 628a and 630a of the respective amplifiers 628 and 630 are connected to ground. This shorts out the low selector 508. The −5 volt signal from the amplifier 502 is also transmitted through the resistor 570 to the noninverting terminal 568 of the low select comparator 560. In this condition, the output from the comparator 560 is negative, and as a consequence, the transistor 566 is turned off. Thus the signal at the output 518 of the high selector 506 will be transmitted to the set point input 96 of the bottoms flow controller module 66.

High selector 506 tests which of the signals at its inputs 514 and 516 is the highest. The −5 volt signal from amplifier 502 is applied to inverting terminal 686 of the amplifier 670. The output 670a of this amplifier 670 attempts to go to a +10 volts. Referring to FIG. 9, the control signal must be 10 volts, otherwise the circuit 500 will be in the override state. This +10 volt control signal drops to +5 volt signal on passing through voltage divider 633. With a +5 volt signal at the noninverting terminal of the amplifier 672 or input 516, the amplifier output 672a attempts to go to +10 volts since this +10 volt signal must pass through the voltage divider 671. The arrangement of the diodes 674 and 676 is such that only the more positive signals from the outputs 670a and 672a will be transmitted through the diode 626 to the set point input 96 of the module 66. In this example, either amplifier output 670a or 672a will be slightly more positive than the other output, but since both are at +10 volts it makes no difference and the circuit 500 is considered to be in the nonoverride state.

Assume, for example, that the voltage signal from the summer 136 was 9 volts. In this instance, the output 672a would be attempting to go to +9 volts. However, this would be 1 volt less positive than the output 670a of the amplifier 670. Consequently, the circuit 500 would go to the override state and the +10 volts signal at the output 670a would be transmitted through the diodes 674 and 626 to the set point 96. The amplifier 672 would be driven to negative saturation.

Assume the liquid level in the tower 12 is exactly at line 494 midway between the upper and lower limits. Under these circumstances, the output signal from amplifier 502 will be zero, causing the high and low select comparators 560 and 562 to arbitrarily switch the transistors 564 and 566 on and off. In this instance, the circuit 500 is in either the high or low select mode of operation and either the high selector 506 or the low selector 508 will test the feed signal. However, referring to FIG. 9, the control signal can range between zero and ten volts and the circuit 500 will be in the nonoverride state. If the high selector 506 is shorted out, this simply means the output of amplifier 672 will be more positive than the output of amplifier 670 and the control signal will be transmitted to the set point input 96. Similarly, if the high selector 506 is shorted out, the output of the amplifier 630 will be less positive than the output of amplifier 628 and the control signal will still be transmitted to the set point input 96.

Assume the liquid level in the tower is at line 490, the lower limit. The level transmitter 54 will be operating at its minimum of capacity or 4 milliamps, and provided the amplifier 502 is set for a gain of 2.5, the output signal of this amplifier 502 will be +5 volts. This +5 volt signal, is applied to the terminals 568 and 578 of the respective amplifiers 560 and 562. This causes the output of amplifier 560 to go positive to turn on transistor 566 to short out the output 518 of the high selector 506. The +5 volt signal from the amplifier 502 is also applied to the inverting terminal 662 of the amplifier 628. Because of the negative bias applied to this terminal 662 from the source 660, the output of amplifiers 628 attempts to go to a 0 voltage level. Under these conditions the control signal must be zero, otherwise the circuit 500 will be in the override state. This 0 voltage signal is applied to the terminal 522 of the amplifier 630. Thus, the output 530a of the amplifier 630 attempts to go to 0 volts. Because of the arrangement of diodes 634 and 636, whichever of the outputs 628a and 630a is less positive, this signal will be transmitted through the diode 620 to the set point input 96 of the module 66. Under the stated conditions, both of the outputs 628a and 630a are attempting to go to zero. One of these will be slightly less positive than the other, but in either event, the 0 volt signal will be transmitted to the set point input 96.

Assume the control signal to be a +2 volt signal. In this case the +2 volt signal would be dropped to +1 volt signal on passing through the divider 633 and applied to the noninverting terminal of the amplifier 630 or input 522. The output of the amplifier 630 would attempt to go to a +2 volt level in order to apply a +1 volt signal through the voltage divider network 642 to the inverting terminal 640. If the liquid level is at line 494, the output of the amplifier 628 will be zero volts and this signal, being less positive than the +2 volt signal at the output of 630a, will be transmitted through the diode 634 and 620 to the set point input 96.

Assume now that the level was between line 492 and 490 so that the output of amplifier 502 would be a +2.5 volt signal, this would indicate that the circuit 500 was still in the low select mode of operation. Under this condition, the output of amplifier 628, since it has a gain of two, would go to +5 volts. If the control signal was still +2 volts, causing the output 630a of amplifier 630 to go to +4 volts, the less positive 4 volt signal at output 630a would be transmitted through diode 636 and 620 to the set point input 96. The amplifier 628 under these conditions would be driven to saturation and there would be no output signal or level signal from this amplifier that would be transmitted to the set point 96.

Calibration Circuit

In accordance with one important feature of our invention, the control signal is calibrated so that the flow of bottoms from the tower 12 will maintain the liquid level within the predetermined upper and lower limits at the lines 492 and 490 (FIG. 8). When the level signal from the transmitter 54 indicates that the level limits are in danger of being exceeded, the control signal is recalibrated. This recalibration is achieved by regulating the calibration signal at the input 120 of the multiplier 132 in the divider module 80. This calibration signal comes from the calibrator module 86 and it is either increased, decreased or maintained constant depending on the relationship between the signals to and from the override module 82. The signal to the override module 82 comes from the summer 136 in the divider module 80. The signal from the override module 82 is the signal to the bottoms flow controller module 66. If these signals to and from the override module 82 are equal, this condition indicates that the relationship between the control signal and level signal is such that the liquid level is not in danger of exceeding either one of the level limits. If the signal from the summer 136 is higher than the signal from the override module 82, the condition indicates the override state prevails and that the level is in danger of exceeding the lower limit at line 490. If the signal from the override module 82 is higher than the signal from the summer 136, this condition indicates that the override state prevails and the liquid level is in danger of exceeding the upper limit at line 492. Depending upon which of these conditions exist, the calibrator control module 84 will command the calibrator module 86 to either hold the signal constant to input 120 of the divider module 80 or increase or decrease this signal to the input 120.

As illustrated in FIG. 12, the calibrator control module 84 includes two comparators 700 and 702. Inputs 704 and 706, respectively of the comparators 700 and 702, receive the output signal from the summer 136. Inputs 708 and 710, respectively of the comparator 700 and 702, receive the output signal from the override module 82. Comparator 700 will have a zero output signal if the signal from the summer 136 is less than the signal from the override module 82. Otherwise the output signal from this comparator 700 will be a logical one. Conversely, the comparator 702 will have a zero output signal if the signal from the summer 136 is greater than the signal from the override module 82. Otherwise the output signal from this comparator 702 will be a logical one.

The calibrator module 86 is designed to slowly change the calibration signal to the input 120 of the divider module 80. It is desirable to recalibrate gradually in order to avoid upsetting any of the other control operations such as the heat or reflux flow which are indirectly controlled by the signals from the divider module 80. We have found that once tower operations have been relatively stabilized or lined out using our control unit 10, recalibration occurs only occasionally. For example, a tower under control of our unit 10 has operated for as long as 16 hours with changing feed flow rates and feed compositions without requiring recalibration of the control signal. When recalibration was required, the override circuit 500 was operable, but only for a few minutes. During this operable state of the override circuit 500, the control signal was properly recalibrated so that the liquid level in the bottom of the tower was no longer in danger of exceeding the upper and lower limits.

The calibrator module 86 includes an up-down binary counter 712 having a binary output, a digital to analog converter 714, and a variable frequency clock 716. The pulsating output signals from the clock 716 are transmitted to either the counter's count up input 712a or the counter's count down output 712b. The counter 712 stores in its memory the pulse count received at either inputs 712a or 712b. The binary number from the counter's output 712c are the algebraic sum of its input pulses. The converter 714 converts this binary number to an analog voltage signal which is transmitted to the input 120 of the multiplier 132 in the divider module 80. In the control unit 10, this analog signal from the converter 714 will ordinarily range from 0 to +10 volts and will vary within this range depending upon the number of pulses received by the counter 712 to either inputs 712a or 712b. The output of the converter 714 is also coupled to an overflow logic circuit 715. The function of this circuit 715 will be described below.

The pulsating signal from the clock 716 is transmitted through a series of decade dividers 718, 719, 720, 721 and 722. Nominally, the frequency of pulses from the clock 716 can vary from zero pulses per second to 711 pulses per second depending upon the position of the control dial 716a. At the full scale position, the pulses from the clock 716 will be 711 pulses per second. At mid scale the pulse output of the clock 716 will be 355 pulses per second. As the pulse signals from the clock 716 proceed from one decade divider to the next, they are divided by a factor 10 until the number of pulses from the decade divider 722 is equal to 25.6 pulses per hour provided the clock 716 is set for 711 pulses per second. There is a manually operated switch 723 which connects the counter 712 to either the output of the decade divider 721 or 722. If moved to the position shown in dotted lines, the number of pulses forward to the counter 712 will be 256 pulses per hour.

The circuit for transmitting the pulse signals to the up-count input 712a includes AND gates 724 and 725, an OR gate 728, an AND gate 730 and an inverter 732. The circuit for transmitting the pulse signals to the down-count input 712b includes AND gates 726 and 727, an OR gate 729, an AND gate 731, and inverter 734. The AND gates 724 through 727 and the AND gates 730 and 731 are enabled only when all the signals at all the respective inputs are a logical one. AND gates 724 through 727 each have three inputs respectively 724a through 724c, 725a through 725c, 726a through 726c, and 727a through 727c. Inputs 724a and 726a are coupled to the outputs of either the decade dividers 721 or 722 depending upon the position of switch 723. Input 724b is connected to the output of the comparator 700 through an inverter 736. Input 726b is connected to the output of the comparator 702 through an inverter 738. The inputs 724c and 726c are coupled to the output of an inverter 742. The inputs 725c and 727c are connected to the output inverter 740. The inputs 725b and 727b respectively connected to the output and input of an inverter 744. The input of the inverter 744 is connected to the output of a comparator 746. This comparator 746 receives at its one input 746a the signal from the square root extractor 157 in the distillate flow controller module 64 and at its other input 746b the output signal from the multiplier 134 at output 112 in the divider module 80. The one signal at input 746b is representative of the actual flow rate of distillate and the other signal at input 746b is representative of the desired or set point flow rate of distillate from divider module 80.

In operation, the calibration signal for the multiplier 132 is initially established by switching the distillate flow controller module 64 to the manual mode of operation. The distillate flow controller module 64 (FIG. 3) is switched to the manual mode of operation by actuating switch 165. As a consequence, the inverter 742 receives a +15 volt signal from the module 64 which is inverted to a logical zero signal. This zero signal disables the AND gates 724 and 726, however, it is inverted to a logical one signal by the inverter 740 and forwarded to the inputs 725c and 727c to enable the AND gates 725 and 727. The operator now closes either push button switches 171 or 173 in module 64 to establish the desired distillate flow rate. This distillate flow rate signal is received at the input 746a of the comparator 746.

The relationship between the signals at the output 112 of the divider module 80 and the output signal from the square root extractor 151 in module 64 determines whether the pulse signal from the decade divider 718 is applied to the counter input 712a or input 712b. The output signal from the square root extractor 151 is forwarded to the input 746a of the comparator 746, and the signal at the output 112 of the divider module 80 is forwarded to the comparator 746 at the comparator input 746b. The output from the comparator 746 governs transmission of the pulse signals to the count-up input 712a or the count-down input 712b of the counter 712. If the distillate measure signal at the input 746a is greater than the distillate set point signal at the input 746b, the output signal from the comparator 746 will be a logical zero and the pulse signals will be transmitted to the count-down input 712b. If the distillate measure signal at the input 746 is less than the distillate set point signal at the input 746b, the output signal from the comparator will be a logical one and the pulse signals will be transmitted to the count up input 712a.

If the output of the comparator 746 is zero, the AND gate 727 is disabled and the AND gate 725 is enabled by the inverter 744 which inverts the logical zero to a logical one and applies it to input 725b of the AND gate 725. Consequently, the pulsating signal from the decade divider 718 is forwarded through the AND gate 725, OR gate 728, AND gate 730 and inverter 732 to the up-count input 712a of the counter 712. This causes the counter 712 to store input signals in its memory, increasing the binary number transmitted to the converter 714. As a consequence, the voltage signal or calibration signal to the multiplier 132 increases in amplitude, causing an increase in the amplitude of control signal transmitted to the set point input 95 of the distillate flow controller 64. This condition will prevail until the signal at the set point input 95 is equal to the measure input signal coming from the square root extractor 151' and being transmitted to the comparator input 746a.

If the output from the comparator 746 is a logical one, the AND gate 727 is enabled, the AND gate 725 is disabled. The pulsating signals from the decade divider 718 would then be transmitted to the count-down input 712b through the circuit including AND gate 727, OR gate 729, AND gate 731 and inverter 734. In this instance, the signal to the set point 95 of the distillate flow controller module 64 would be decreased in amplitude until it equaled the signal from the amplifier 161. When the signals to the inputs 746a and 746b of the comparator 746 are equal, the output of the comparator would switch continuously between a logical zero and one to hold the signal to the set point 95 within ± one count of the desired signal to the set point input 95 of the module 64.

Note that during start up, the pulse signal from the decade divider 718 is substantially higher than the pulse signal from the decade divider 721 and 722. The reason for this is to permit the operator to quickly calibrate the multiplier 132 during start up operations. When this is accomplished, the operator switches the switch 165 (FIG. 3) to return the distillate flow controller module 64 to the automatic mode of operation. In this instance, the signal to the inverter 742 will be a zero signal which on being inverted twice by amplifiers 742 and 740 disables AND gates 725 and 727. In this mode, however, the inverted signal from inverter 742 enables the AND gates 724 and 726.

After the calibration signal has been initially adjusted, the pulsating signals from the clock 716 are transmitted to the counter 712 through either the decade dividers 721 or 722 and the AND gates 724 or 726. These AND gates 724 and 726 will be enabled to transmit the pulsing signals to the counter 712 when the calibrator control 84 responds to the override circuit 500 going to the override state. If the output signal from the summer 136 is less than the output signal from the override module 82, the output of comparator 700 goes to zero. This zero signal is inverted by inverter 736 enabling AND gate 724. The pulsating signals are then forwarded to the up-count input 712a of the counter 712. This will adjust the voltage signal accordingly to remove less bottoms from the tower 12. Similarly, if the signal from the summer 136 is greater than the output signal from the override module 82, the comparator 702 has a zero at its output which is inverted by inverter 738 to enable AND gate 726. The pulsating signals are then forwarded to the down-count input 712b of the counter 712. The signal from the converter 714 is adjusted accordingly so that the flow rate of bottoms is decreased.

Calibration could be accomplished equally well using a combination of the digital techniques described above and the process of analog integration. This would involve the generation of both positive and negative low energy pulses of the clock frequency. These pulses are then gated to an integrator where one polarity will ramp the integrator up and the other polarity will ramp it down. A similar comparator would provide initial calibration in manual work by "pumping" the integrator until distillate set point equals measurement as previously described.

OPERATION

From an operator's view point, the operation of our control unit 10 is best illustrated in FIG. 2. This unit 10 assumes many of the duties previously performed by the operator. For example, the signals to the set points of the reflux, distillate, bottoms and heat flow control modules 62, 64, 68, and 70 are under the control of the unit 10 rather than being manually adjusted. From an operator's standpoint, the control unit 10 is easy to understand and use. This control unit 10 tells the operator a great deal about what the tower 12 is doing, what the unit 10 is doing, how the tower operations are being controlled, and what control functions are in force. For example, whether or not the override circuit 500 is in the override state.

As illustrated in FIG. 2, each controlled process condition: namely, the reflux, distillate, bottoms, and heat flow rates, can be either manually or automatically controlled. For example, if the operator wished to manually control distillate flow rate, he switches switch 165 to the manual position and depresses either push button 173 or 175 to open or close the distillate valve 34. The valve position is indicated by the pointer 145 of the valve meter 151.

To go to automatic, the switches 165, 165a, 165b and 400 are switched by the operator to the automatic position. The flow of reflux, distillate, bottoms and heat is now under the control of the unit 10 where the signal to the various set points of the various flow control modules 62, 64, 66 and 68 is automatically provided in response to the feed flow signal from the feed transmitter 56. This signal is square root extracted so that the operator can observe a linear measurement indicated by the pointer position on the scale 129 of the feed flow rate meter 128.

The transfer from the manual control of the valve positions to automatic control of valve positions or vice versa is a bumpless operation. That is, transfer is achieved with a smooth transition between the automatic and manual mode without causing abrupt changes in flow rate. Bumpless transfer is accomplished either automatically or can be easily achieved by the operator adjusting certain control dials. This will be explained below.

In the automatic mode, the reflux flow rate is set by the distillate flow rate. If desired, however, the operator can adjust the flow rate by controlling the position of the dial 207. This will provide a calibration signal to the input 206 of the multiplier 194 (FIG. 4). As described above, the reflux signal is automatically adjusted for changes in reflux temperature. If the reflux fluid becomes cooler and deviates from the standard temperature, the reflux flow rate will be automatically reduced. Similarly, if the reflux temperature increases, the reflux flow rate will be increased. The reflux flow rate, however, is maintained within limits as established by the operator. The operator by turning either dials 222 or 224 sets these limits. Pointer's positions on the scale 117a permits the operator to observe the actual flow rate versus the desired reflux flow rate. When the pointers are opposite each other the actual flow rate equals the desired flow rate. The top pointer is indicative of the desired flow rate. Transfer from automatic control of the reflux flow to manual control is bumpless. The transfer from manual to automatic is achieved by aligning the reflux set point by adjusting the dial 207 with the measure set point so that the pointers on the scale 117 are in alignment. The switch 165a is then moved to the automatic position. The lights 224 and 226 indicate when either the high or low limit is in force. If it is desirable to reflux at a fixed flow, the limits may be crossed. That is, turn the high limit dial 224 to zero and turn the low limit 222 to the desired set point. Since the low limit always overrides the high limit, the flow set point is now fixed by the low limit dial position.

The ratio of the distillate flow rate to bottoms flow rate can be controlled automatically or manually. To control this ratio manually, the operator switches the switch 142 to the manual position. He then adjusts the dial 152 to achieve the desired ratio between the bottoms and distillate flow rate. The distillate meter scale 117 has its upper and lower pointers in alignment when the actual distillate flow rate equals the desired or set point flow rate. The operator can also observe the actual versus desired bottoms flow rate by noting the position of the pointers on the bottoms meter scale 117b.

In the automatic mode for adjusting the ratio of distillate and bottoms flow rates, the switch 142 is switched to the automatic position enabling the temperature flow control module 78 to adjust this ratio. Changes in feed composition as reflected by a change in temperature detected by the thermocouple 42 cause the temperature controller module 78 to adjust the ratio between distillate and bottoms flow rate automatically. The set point of the temperature controller module can be set manually by closing the switch 157 in the temperature conroller module 78 and then adjusting the dial 185 to the desired setting. However, in accordance with one feature of our invention the set point of the temperature controller module 78 is set automatically by means of the composition controller module 76 and the composition analyzer innerface module 74. Moving the switch 142 from the manual to automatic position is bumpless since the temperature controller module 78 tracks the manual signal during the manual mode of operation. When switching from automatic to the manual mode of operation, the dial 152 must be adjusted so that the deviation meter 151 is nulled as indicated by the needle pointer 151 moving to the center position of the meter scale 153.

The flow of heat to the tower 12 increases or decreases in response to an increase or decrease in the distillate flow rate. However, any incipient changes in the tower pressure as detected by the pressure transmitter 44 modify the heat flow rate to maintain tower pressure constant. The position of the lower pointer on the pressure meter provides the operator with a visual indication of the tower pressure. The operator can change this tower pressure by adjusting the dial 422. The position of the pointers on the heat flow meter scale 453a provide the operator with a visual indication of the actual and desired heat flow rate.

In accordance with an important feature of our invention, the material balance of the tower 12 is maintained by the override system 110. The position of the pointer on the level meter scale 558a provides the operator a visual indication of the liquid level position. If the pointer is exactly mid scale, the liquid level is at line 494. As the pointer moves to the left of center scale, the liquid level approaches the low limit at line 492. As the pointer moves to the right of scale center, the liquid level approaches the low limit at line 490. If the override circuit 500 is in the override state and the low select mode of operation, the light 604 is turned on. Conversely, if the override circuit 500 is in the high select mode of operation, the light 606 is on. Thus, the operator can observe when the multiplier 132 in the divider module 80 is being recalibrated.

The advantages of our control unit 10 are manifold. It is compact, easy to maintain, economical to produce and install. Although internally, the control unit 10 is complex, from an operator's standpoint it is very easy to understand and operate. Our control unit 10 provides fine control of a fractionation tower and like direct digital control is able to assume many of the operator's duties, permitting the operator to monitor the tower 12 more objectively. However, unlike direct digital control, it is not dependent upon a digital computer which requires programming, peripheral equipment, memory storage, and the other expense items normally associated with direct digital control of complex chemical or petroleum processes in addition to specially trained computer experts. Our control unit 10 provides reduced utility costs, since less heat is used to maintain constant tower pressure. Our control unit 10 improves safety in tower operations. There is also improved product quality and an increased recovery of the desired separated products and increased throughput of materials through the tower. Thus, with our unit 10, substantial economies are achieved resulting in reduced product cost and improved profibability of operations. Conceivably, widespread use of this control unit throughout a typical large oil refinery could produce several million dollars increase in annular return.

The above description of our control unit illustrates the best mode of making and using our control unit 10. This unit 10 could be modified for use with a fractionation tower employing a non-flooded drum condenser. This would require the use of an override system similar to that disclosed in FIGS. 8 through 12 for monitoring the level of liquid in the drum condenser. This, however, would be a more complex system. In the unit 10 disclosed, the distillate flow rate signal is fed forward to the reflux controller module and the pressure controller module 72. We have used the lagged feed signal directly rather than the distillate flow rate signal for controlling the reflux flow controller module and the pressure controller module's operations. The use of the distillate flow rate signal is the more desirable mode of control. However, the use of the lagged feed signal, would in some cases be acceptable.

The divider system 104, the reflux controller system 106, the pressure controller system 108, and the override system 110 are used in combination to control the fractionation tower 12. However, we believe each of these systems is unique and could be used independently of the other systems. For example, the divider system 104 could be used where a feed comprising two or more materials pass through a separating zone which separates the two materials into streams of the different materials and having different product specifications. Pressure system 108 could be used in any process having at least three variable and interrelated conditions. The override system 110 could also be used in any process having at least three variable and interrelated conditions where one condition is controlled, another condition is uncontrolled and still another condition is maintained within predetermined limits. The reflux controller system 106 could be used in any fractionation tower where a portion of the distillate is returned to the tower as reflux or in other processes requiring temperature compensation.

The attached drawings and accompanying description have been presented to illustrate the preferred embodiments of our invention. Modifications can be made in the control unit 10 and the divider system 104, reflux and pressure controller systems 106 and 108, and override system 110 without departing from the principles of our invention as defined in the following claims.

We claim:

1. For use with a fractionation tower where feed and heat flow into the tower and the feed is distilled and separated into distillate and bottoms having different product specifications, said distillate and bottoms flowing from the tower, with a portion of the distillate being returned to the tower as reflux, and a portion of the bottoms collecting in the tower and establishing a liquid level in the tower which fluctuates within predetermined limits, control apparatus including:

reflux controller means for automatically controlling the reflux flow rate;

pressure controller means for automatically controlling the pressure within the tower;

distillate controller means for automatically controlling the distillate flow rate;

bottoms controller means for automatically controlling the bottoms flow rate;

divider means responsive to variations in the feed flow rate and feed composition for automatically controlling the distillate and bottoms controllers to adjust the distillate and bottoms flow rates and the ratio between these flow rates such that said distillate and bottoms meet product specifications despite variations in feed flow rate and feed composition; and override means for automatically controlling the material balance within the tower, said override means being responsive to the fluctuations in the liquid level, and when the liquid level is in danger of exceeding said predetermined limits, said override means terminating control of the bottoms controller means by the divider means and controlling said bottoms controller means as a function of the liquid level until said liquid level is no longer in danger of exceeding said predetermined limits.

2. The control apparatus of claim 1 including means for manually adjusting the ratio between the distillate and bottoms flow rates and for manually controlling the distillate, bottoms, reflux and heat flow rates.

3. The control apparatus of claim 1 including means calibrated to maintain the bottoms flow rate such that said liquid level is within said predetermined limits, and calibration means for said calibrated means which calibrates said calibrated means whenever the override means terminates control of the bottoms controller means by the divider means.

4. The control apparatus of claim 1 wherein the pressure controller means maintains the pressure within the tower essentially constant, said pressure controller means including means for controlling the heat flow rate so that said heat flow rate is changed in response to any incipient pressure changes to maintain tower pressure essentially constant.

5. The control apparatus of claim 1 where the reflux controller means includes means responsive to the reflux temperature for modifying the reflux flow rate as the reflux temperature deviates from a standard temperature.

6. The control apparatus of claim 1 where the reflux controller means includes means for establishing a maximum and a minimum reflux flow rate.

7. For use in a fractionation tower where feed and heat flow into the tower and the feed is distilled and separated into distillate and bottoms having different product specifications, said distillate and bottoms flowing from the tower, with a portion of the distillate being returned to the tower as reflux and a portion of the bottoms collecting in the tower and establishing a liquid level in the tower which fluctuates within predetermined limits, control apparatus including:

reflux controller means for automatically controlling the reflux flow rate, said reflux controller means including means responsive to the reflux temperature for modifying the reflux flow rate as the reflux temperature deviates from a standard temperature, and means for establishing a maximum and minimum reflux flow rate;

pressure controller means for automatically controlling the pressure within the tower, said pressure controller means including means for controlling the heat flow rate so that said heat flow rate is changed in response to any incipient pressure changes to maintain tower pressure essentially constant distillate controller means for automatically controlling the distillate flow rate;

bottoms controller means for automatically controlling the bottoms flow rate;

divider means responsive to variations in the feed flow rate and feed composition for controlling the distillate and bottoms controllers to adjust the distillate and bottoms flow rates and the ratio between the flow rates such that said distillate and bottoms meet product specifications despite variations in feed flow rate and feed composition;

override means for controlling the material balance within the tower, said override means being responsive to the fluctuations in the liquid level, and when the liquid level is in danger of exceeding said predetermined limits, said override means terminating control of the bottoms controller means by the divider means and controlling said bottoms controller means as a function of the liquid level until said liquid level is no longer in danger of exceeding said predetermined limits;

means calibrated to maintain the bottoms flow rate within said predetermined limits; and calibration means for said calibrated means which calibrate said calibrated means whenever the override means terminates control of the bottoms controller means by the divider means.

8. The control apparatus of claim 7 including means for manually adjusting the ratio between the distillate and bottoms flow rates and for manually controlling the distillate, bottoms, reflux and heat flow rates.

9. For use with a fractionation tower where feed flows into the tower and is separated into distillate and bottoms which flow from the tower, a portion of said bottoms collecting in the tower to establish a liquid level in the tower which fluctuates within predetermined limits, control apparatus comprising:

means providing a control signal which changes as the feed flow rate or feed composition change;

means providing a level signal proportional to the level of liquid as said liquid level fluctuates between said limits;

first controller means responsive to the control signal for controlling the rate at which distillate flows from the tower;

second controller means responsive to the control signal and the level signal for controlling the rate at which bottoms flow from the tower, said second controller means on receiving the control signal changing the bottoms flow rate as said control signal changes, and on receiving the level signal changing the bottoms flow rate as the level signal changes; and transmission means for transmitting the control signal to the first and second controller means and for transmitting the level signal to the second controller means, said transmission means including a. multiplier means calibrated to maintain the distillate and bottoms flow rates such taht said liquid level is within said predetermined limits, b. override means having a nonoperable and operable state, said override means in the nonoperable state preventing transmission of the level signal to the second controller means and in the operable state terminating transmission of the control signal to the second controller means and transmitting the level signal to the second controller means, said override means being in the nonoperable state when the relationship between the control signal and level signal indicates that the level limits are not in danger of being exceeded, and being in the operable state when the relationship between the feed flow rate and the bottoms level indicate that the level limits are in danger of being exceeded, and c. calibration means for the multiplier means for calibrating said multiplier means whenever said override means is in the operable state.

10. The control apparatus of claim 9 where means providing the control signal include means for automatically controlling the ratio between the distillate and bottoms flow rates for a feed of a given composition so that said distillate and bottoms meet predetermined product specifications, said ratio controlling means including means for detecting changes in the feed composition, and, in response to such changes, for altering the ratio between distillate and bottoms flow rates so that distillate and bottoms maintain said product specifications as the composition of the feed changes.

11. The control apparatus of claim 10 where the multiplier means include a summer having first and second inputs and an output, said summer generating a signal at its output which is a function of the difference between the signals at the inputs, and first and second multipliers each having first and second inputs and an output and each generating a signal at their respective outputs which is a function of the multiple of the signals at their respective inputs, said summer having its output connected to the override means, so that with the override means in the nonoperable state the signal at the summer output is transmitted to the second controller means, said first multiplier having its output connected to the first input of the second multiplier and the first input of the summer, and having its first input connected to the means for monitoring the feed flow rate to receive the feed signal and its second input connected to the calibration means to receive a calibration signal from said calibration means, said second multiplier having its output connected to the first controller means and to the second output of the summer, and having its second input connected to the means for detecting changes in the feed composition to receive a ratio control signal for controlling the ratio of distillate to bottoms flow rates.

12. The apparatus of claim 11 where the first and second multipliers are calibrated to enable the output signal from the summer to discontinue flow of bottoms when the flow of feed has been discontinued.

13. The control apparatus of claim 11 where the means for detecting changes in feed composition include composition analyzer means for automatically analyzing separated product flowing from the tower to determine if the separated product meets product specifications and for generating a product signal indicative of said separated product composition, means in the tower for measuring the temperature and for generating a temperature signal, and means responsive to the product and temperature signals for generating the ratio control signal and sending said ratio control signal to the second multiplier second input.

14. The control apparatus of claim 13 where the ratio control signal generating means includes means for automatically regulating the amplitude of the ratio control signal.

15. The control apparatus of claim 14 including means for manually regulating the amplitude of the ratio control signal transmitted to the second multiplier second input.

16. The control apparatus of claim 14 including means for automatically switching to the manual means for regulating the ratio control signal amplitude whenever the product signal indicates that analyzer means has malfunctioned.

17. The control apparatus of claim 14 where the automatic amplitude regulating means includes a set point input for receiving the product signal, a measure input for receiving the temperature signal, and an output where the control signal is generated, said regulating means holding the amplitude of the ratio control signal constant when the temperature signal and product signal are equal, indicating that the distillate and bottoms flow rates are such that the distillate and bottoms meet product specifications, and changing the amplitude of the control signal when the temperature and product signals are unequal, such change in ratio control signal amplitude continuing until the ratio of distillate and bottoms flow rates is changed so that the temperature and product signals are restored to equality.

18. The control apparatus of claim 17 including means operable when said switching means switches the control of the ratio control signal to manual for transmitting to the set point input of the automatic amplitude regulating means a signal equal to the temperature signal.

19. For use with a fractionation tower where constituent light and heavy components of a feed comprising two or more materials having different boiling points are separated into distillate and bottoms, said distillate and bottoms flowing from the tower as two different streams of materials having different product specifications, with a portion of the bottoms collecting in the tower to establish a liquid level which fluctuates within predetermined limits, control apparatus comprising means providing a control signal which changes as the feed flow rate or feed composition change;

means providing a level signal proportional to the level of liquid as said liquid level fluctuates between said limits;

first controller means responsive to the control signal for controlling the rate at which the distillate flows from the tower, said distillate flow rate changing as the control signal changes;

second controller means responsive to the control signal and the level signal for controlling the rate at which bottoms flow from the tower, said second controller means on receiving the control signal changing the bottoms flow rate as the control signal changes, and on receiving the level signal changing the bottoms flow rate as the level signal changes;

means for regulating the ratio between the distillate and bottoms flow rates including means responsive to changes in the feed composition for altering the ratio between distillate and bottoms flow rates so that the streams of distillate and bottom materials maintain said product specifications as the feed composition changes;

calibrated means for maintaining the bottoms flow rate such that said liquid level is within said predetermined limits;

means for transmitting the control signal to the first controller means;

means for transmitting the control signal and level signal to the second controller means including override means having a nonoperable state preventing transmission of the level signal to the second controller means and in the operable state terminating the transmission of the control signal to the second controller means and transmitting said level signal to said second controller means, said override means being in the operable state when the relationship between the control signal and the level signal indicates that the predetermined level limits are in danger of being exceeded; and calibration means for the calibrated means which calibrates said calibrated means whenever said override means is in the operable state.

20. For use with a fractionation tower, control apparatus for controlling the reflux, distillate, bottoms and heat flow rates in response to the feed flow rate, including reflux flow controller means;
distillate flow controller means;
bottoms flow controller means;
heat flow controller means;

each of said controller means having a set point input, a measure input, and a control signal output, said controller means holding the control signal at its output constant when the signals at their respective inputs are equal and responding to signals at their inputs which are unequal to change the control signals at their respective outputs to adjust the controlled process conditions until the signals at their respective inputs are restored to equal amplitude;

means responsive to the reflux flow rate for generating a reflux flow signal proportional to the actual reflux flow rate and for transmitting this reflux flow signal to the measure input of the reflux flow controller;

means responsive to the distillate flow rate for generating a distillate flow signal proportional to the actual distillate flow rate and for transmitting this distillate flow signal to the measure input of the distillate flow controller;

means responsive to the bottoms flow rate for generating a bottoms flow signal proportional to the actual bottoms flow rate and for transmitting this bottoms flow signal to the measure input of the bottoms flow controller;

means responsive to the heat flow rate for generating a heat flow signal proportional to the actual heat flow rate and for transmitting this heat flow signal to the measure input of the heat flow controller;

means responsive to the feed flow rate for generating a control signal proportional to the feed flow rate and for transmitting this control signal to the set point inputs of the reflux, distillate, bottoms and heat flow controller means;

means for controlling the reflux flow rate including means responsive to the control signal from the reflux flow controller means output;

means for controlling the distillate flow rate including means responsive to the control signal from the distillate flow controller means output;

means for controlling the bottoms flow rate including means responsive to the control signal from the bottoms flow controller means output; and means for controlling the heat flow rate including means responsive to the control signal from the heat flow controller means output.

21. The control apparatus of claim 20 including divider means responsive to variations in the feed flow rate and feed composition for automatically controlling the distillate and bottoms controllers to adjust the distillate and bottoms flow rates and the ratio between these flow rates such that said distillate and bottoms meet predetermined product specifications despite variation in feed flow rate and feed composition; and override means for automatically controlling the material balance within the tower, said override means being responsive to the fluctuations in the liquid level in the bottom of the tower, and when the liquid level is in danger of exceeding predetermined limits, said override means terminating control of the bottoms controller means by the divider means and controlling said bottoms controller means as a function of the liquid level until said liquid level is no longer in danger of exceeding said predetermined limits.

22. The control apparatus of claim 21 including means calibrated to maintain the bottoms flow rate such that said liquid level is within said predetermined limits, and calibration means for said calibrated means which calibrates said calibrated means whenever the override means terminates control of the bottoms controller means by the divider means.

23. The control apparatus of claim 22 wherein a pressure controller means maintains the pressure within the tower essentially constant, said pressure controller means including means for controlling the heat flow rate so that said heat flow rate is changed in response to any incipient pressure changes to maintain tower pressure essentially constant.

24. The control apparatus of claim 23 where the reflux controller means includes means responsive to the reflux temperature for modifying the reflux flow rate as the reflux temperature deviates from a standard temperature.

25. The control apparatus of claim 24 where the reflux controller means includes means for establishing a maximum and a minimum reflux flow rate.

26. The control apparatus of claim 25 including means for manually adjusting the ratio between the distillate and bottoms flow rates and for manually controlling the distillate, bottoms, reflux and heat flow rates.

27. Control apparatus for controlling separation of constituent components of a feed comprising two or more materials, said two components flowing from a separation zone as two different streams of materials having different product specifications, comprising means for controlling the flow rates of said components leaving said zone to establish a ratio between the flow rates for a feed of a given composition so that said separated materials meet said product specifications, and means for detecting changes in the feed composition and in response to such changes altering the ratio between the flow rates so that the streams of separated material maintain said product specifications and maintain the material balance as the composition of feed changes.

28. The apparatus of claim 27 additionally including means for monitoring the rate at which feed flows into the zone and for providing a signal proportional to this feed flow rate, and means responsive to the feed flow rate signal which change the flow rates of separated materials in proportion to the changes in feed flow rate.

29. Apparatus for controlling the flow of reflux in a fractionation tower where a mixture of materials having different boiling points is distilled and a portion is withdrawn as distillate and a portion is returned to the fractionation tower as reflux, comprising
  controller means having a set point input, a measure input, and a control signal output, said controller means holding the control signal at its output constant when the signals at its inputs are equal and responding to signals at its inputs which are unequal to change the control signal at its output to adjust the reflux flow rate until the signals at its inputs are restored to equal amplitude;
  means for controlling reflux flow including means responsive to said control signal from the controller means output for changing said reflux flow as said control signal changes;
  means for monitoring the reflux flow rate and providing a signal proportional to this reflux flow rate;
  means for monitoring the reflux temperature and providing a temperature signal proportional to this temperature;
  means for monitoring the distillate flow rate and providing a signal proportional to distillate flow rate; and
  means for transmitting the reflux flow rate signal to the measure input of the controller means and for transmitting the distillate flow rate signal to the set point of the controller means, including means responsive to the temperature signal for modifying the input signal to the controller set point so that deviation in reflux temperature from a predetermined reflux temperature alters the signal to the controller set point input to compensate for this temperature deviation.

30. The apparatus of claim 29 including adjustable means for establishing high and low limits which control the transmission of the signal to the controller set point input such that said signal to said set point input must come within the high and low limits to be transmitted to said set point input.

31. For use with a process having at least three variable and interrelated conditions, one of said conditions being controlled, another of said conditions being uncontrolled and still another of said conditions being maintained within predetermined limits, control apparatus comprising;
  first means for monitoring the uncontrolled condition and providing a signal proportional to this uncontrolled condition;
  second means for monitoring the controlled condition and providing a signal proportional to this controlled condition;
  third means for monitoring the limited condition and providing a signal proportional to this limited condition;
  controller means having a set point input, a measure input, and a control signal output, said controller means holding the control signal at its output constant when the signals at its inputs are equal and responding to signals at its inputs which are unequal to change the control signal at its output to adjust the controlled process condition until the signals at its inputs are restored to equal amplitude;
  means for controlling said controlled process condition including means responsive to said control signal from the controller output, said controlling means changing said controlled condition as said control signal changes;
  means for transmitting the signal from the first monitoring means to the set point input of the controller means and for transmitting the signal from the second monitoring means to the measure input of the controller means; and
  override means having a nonoperable state and an operable state where the override means terminates transmission of the first monitoring signal to the controller set point input and transmits to said controller set point input the signal from the third monitoring means, said override means including means for comparing the signals from the third monitoring means with at least one of the signals from one of the other monitoring means and, when a predetermined relationship exists between compared signals indicating corrective action should be taken to maintain said limited condition within said predetermined limits, for switching the override means to the operable state.

32. The control apparatus of claim 31 where the transmitting means includes means calibrated to maintain the limited condition within said predetermined limits, and calibration means for said calibrated means which calibrates said calibrated means whenever the override means transmits the signal to the controller means.

33. For use with a process where liquid flows into and from containing means, and the liquid level in the containing means deviates from a predetermined point between predetermined upper and lower limits, control apparatus including
  means for monitoring the influent flow rate at which liquid flows into the containing means and for generating a control signal proportional to said flow rate;
  means for monitoring the liquid level and for generating a level signal proportional to the liquid level;
  controller means responsive to the control signal and the level signal for controlling the effluent flow rate at which liquid flows from the containing means, said controller means on receiving the control signal changing the effluent flow rate as the control signal changes, and on receiving the level signal changing the effluent flow rate as the level signal changes;
  signal transmission means for the level and control signals, said transmission means having a high select mode of operation when liquid level is above said predetermined point and a low select mode of operation when the liquidu level is below said predetermined point, said transmission means in the high select mode transmitting to the controller means whichever of the signals has the highest amplitude and in the low select mode transmitting to the controller means whichever of the signals has the lowest amplitude.

34. The control apparatus of claim 33 where in the transmission means including means calibrated to maintain the flow of liquid from the containing means such that said liquid level is within said predetermined limits, and calibration means for said calibrated means which calibrates said calibrated means whenever the transmission means transmits the level signal to the controller means.

35. For use with a process having at least three variable and interrelated conditions, apparatus operable in either a manual mode or an automatic mode of operation for controlling at least one of said process conditions, comprising multiplier means having first and second inputs and an output transmitting a signal that is a function of the signals received at the multiplier's inputs, said first multiplier input receiving a signal proportional to an uncontrolled process condition;

first controller means having a set point input connected to the multiplier output, a measure input which receives a signal proportional to the control process condition, and a control signal output, said first controller means responding to the signals at its inputs having unequal amplitudes to change the control signal at its output until the signal at its inputs are of equal amplitude;

second controller means having a set point input, a measure input which receives a signal proportional to an uncontrolled process condition other than the uncontrolled process condition signal received by the first controller means, and a control signal output, second controller means responding to the signals at its inputs having unequal amplitude to change the control signal at its output until the signals at its inputs are of equal amplitude;

comparator means having first and second inputs and an output, said first input receiving a signal proportional to said control process condition and said second input receiving a signal from multiplier output, said comparator output signal during manual mode remaining constant so long as the signal at the comparator inputs are equal and, when said input signals are unequal, said output signal increasing or decreasing in proportion to the difference between input signals;

means for connecting the second controller output to the second multiplier input when the apparatus is in the automatic mode and for disconnecting said controller output and said second multiplier input when the apparatus is in the manual mode;

means for connecting the comparator output to the second multiplier input when the apparatus is in the manual mode, and for disconnecting said comparator output and said second multiplier input when the apparatus is in the automatic mode;

means for following the signal from the comparator output during the manual mode, and, on switching from the manual mode to the automatic mode, for regulating the output signal from the second controller means so that said output signal initially equal the comparator output signal immediately preceding switching from the manual to the automatic mode; and means for switching the apparatus between automatic and manual mode of operation, said switching means including means for regulating the first controller means output signal manually during said manual mode of operation.

36. A method for controlling the operation of a fractionation tower comprising
   a. monitoring changes in feed composition and feed flow rate,
   b. withdrawing distillate and bottoms from the tower at rates in accordance with changes in the feed composition and feed flow rate,
   c. maintaining the tower pressure essentially constant by controlling heat flow to the tower in accordance with changes in the feed composition and feed flow rate, and
   d. permitting the liquid level in the bottom of the tower to fluctuate within predetermined upper and lower limits.

* * * * *

UNITED STATES PATENT OFFICE
CERTIFICATE OF CORRECTION

Patent No. 3,905,873                    Dated September 16, 1975

Inventor(s) Wright, Robert M., Johncock, Allan W.

It is certified that error appears in the above-identified patent and that said Letters Patent are hereby corrected as shown below:

| | | | |
|---|---|---|---|
| Inventor: | | | "Allan W. Joncock" should be -- Allan W. Johncock |
| Abstract, | line | 16 | "an" should be -- An |
| Column 8, | " | 42 | "inpput" should be -- input |
| " 16, | " | 43 | "pressure, upsetting sewer operations" should be -- pressure, upsetting tower operations |
| " 18, | " | 43 | "A 62 resistor" should be -- A 62 kilohm resistor |
| " 19, | " | 55 | "0°" should be -- zero |
| " 23, | " | 37 | "amplitude" should be -- amplifier |
| " 26, | " | 36 | "thouogh" should be -- through |
| " 26, | " | 63 | "from the various transmitters" should be -- from the various flow transmitters |
| " 30, | " | 4 | Insert the word --volts-- after "+5" |
| " 34, | " | 59 | Insert the word --input-- after "set point" |
| " 44, | " | 64 | "taht" should be -- that |
| " 50, | " | 63 | "liquidu" should be -- liquid |

Signed and Sealed this

Thirty-first Day of August 1976

[SEAL]

Attest:

RUTH C. MASON
Attesting Officer

C. MARSHALL DANN
Commissioner of Patents and Trademarks